US 12,051,921 B2

(12) United States Patent
Kuranuki

(10) Patent No.: US 12,051,921 B2
(45) Date of Patent: Jul. 30, 2024

(54) ENERGY TRANSFER CIRCUIT AND POWER STORAGE SYSTEM

(71) Applicant: Panasonic Intellectual Property Management Co., Ltd., Osaka (JP)

(72) Inventor: Masaaki Kuranuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 449 days.

(21) Appl. No.: 17/611,211

(22) PCT Filed: Apr. 27, 2020

(86) PCT No.: PCT/JP2020/017888
§ 371 (c)(1),
(2) Date: Nov. 15, 2021

(87) PCT Pub. No.: WO2020/241144
PCT Pub. Date: Dec. 3, 2020

(65) Prior Publication Data
US 2022/0216703 A1  Jul. 7, 2022

(30) Foreign Application Priority Data
May 24, 2019  (JP) ................................. 2019-097418

(51) Int. Cl.
*H01M 10/44* (2006.01)
*H01M 10/48* (2006.01)
*H02J 7/00* (2006.01)

(52) U.S. Cl.
CPC ......... *H02J 7/0019* (2013.01); *H01M 10/441* (2013.01); *H01M 10/48* (2013.01)

(58) Field of Classification Search
CPC .... H01M 10/441; H01M 10/48; H01M 10/44; H02J 7/0016; H02J 7/0019
(Continued)

(56) References Cited

U.S. PATENT DOCUMENTS 6,150,795 A * 11/2000 Kutkut .................. H02J 7/0018
320/118
8,779,722 B2 * 7/2014 Lee ......................... H02J 7/345
320/122
(Continued)

FOREIGN PATENT DOCUMENTS

CN    103066665 A  *  4/2013
CN    105871022 A  *  8/2016
(Continued)

OTHER PUBLICATIONS

CMOS-Power-Calculation (https://resources.pcb.cadence.com/blog/2023-cmos-power-calculation) (Year: 2023).*
(Continued)

*Primary Examiner* — Drew A Dunn
*Assistant Examiner* — Mary G Bartlett
(74) *Attorney, Agent, or Firm* — Rimon P.C.

(57) ABSTRACT

Cell selection circuit includes a plurality of first wiring switches, that selectively connect one of both ends of a selected cell to first wiring and at least one second wiring switch that selectively connects the other end of both the ends of the selected cell to second wiring. Clamp circuit includes clamp switches for forming a closed loop including inductor in a state where cell selection circuit does not select any cell. Controller turns on all of a plurality of switching elements forming a discharge path after the clamp state is ended, and then turns on a part of a plurality of switching elements constituting clamp switch before the state is switched to a next clamp state.

17 Claims, 15 Drawing Sheets

(58) Field of Classification Search
USPC .................................................. 320/127, 137
See application file for complete search history.

(56) References Cited

U.S. PATENT DOCUMENTS

| | | | | |
|---|---|---|---|---|
| 9,203,246 | B2 | 12/2015 | Kang et al. | |
| 9,231,420 | B2* | 1/2016 | Jo .......................... | H02J 7/0031 |
| 11,251,628 | B2* | 2/2022 | Peretz ................... | H02J 7/0016 |
| 2008/0224667 | A1* | 9/2008 | Tanaka ................. | H01M 10/44 |
| | | | | 320/137 |
| 2009/0167242 | A1* | 7/2009 | Naganuma ............ | H02J 7/0025 |
| | | | | 320/118 |
| 2012/0206095 | A1* | 8/2012 | Marten ................. | H01M 10/44 |
| | | | | 320/107 |
| 2013/0093248 | A1* | 4/2013 | Liu ....................... | H01M 10/441 |
| | | | | 307/77 |
| 2013/0241498 | A1* | 9/2013 | Koebler ............... | H01M 10/425 |
| | | | | 361/87 |
| 2014/0239878 | A1* | 8/2014 | Yun ....................... | H02J 7/0019 |
| | | | | 320/103 |
| 2014/0340022 | A1* | 11/2014 | Kang ................... | H02J 7/0014 |
| | | | | 320/103 |
| 2015/0002096 | A1* | 1/2015 | Suzuki ................. | H01M 10/48 |
| | | | | 320/112 |
| 2015/0137857 | A1* | 5/2015 | Kusama ................ | H02M 3/158 |
| | | | | 327/109 |
| 2015/0340886 | A1* | 11/2015 | Sung ..................... | H02J 7/0016 |
| | | | | 320/118 |
| 2016/0043578 | A1* | 2/2016 | Miyamoto ........... | H01M 10/482 |
| | | | | 320/118 |
| 2016/0197499 | A1* | 7/2016 | Kaita ..................... | B60L 3/0046 |
| | | | | 320/103 |
| 2018/0019606 | A1* | 1/2018 | Kang .................... | H02J 7/0019 |
| 2019/0148952 | A1* | 5/2019 | Remboski ............ | H02J 7/00302 |
| | | | | 320/128 |
| 2019/0334430 | A1* | 10/2019 | Higashiyama .......... | H02M 1/34 |
| 2020/0136413 | A1* | 4/2020 | Yanagizawa ........ | H01M 50/529 |
| 2020/0144841 | A1* | 5/2020 | Baruzzi ............... | H02J 7/00714 |
| 2021/0313813 | A1* | 10/2021 | Kuranuki .............. | H01M 10/48 |

FOREIGN PATENT DOCUMENTS

| | | | | | |
|---|---|---|---|---|---|
| CN | 106532852 | A | * | 3/2017 | ............ H02J 7/0016 |
| CN | 108110817 | A | | 6/2018 | |
| CN | 108110817 | A | | 6/2018 | |
| CN | 110649336 | A | * | 1/2020 | ........ H01M 10/4207 |
| DE | 102009016759 | A1 | | 10/2010 | |
| JP | 7-322516 | | | 12/1995 | |
| JP | H07322516 | A | * | 12/1995 | |
| JP | 2015100175 | A | * | 5/2015 | |
| KR | 101483517 | B1 | * | 1/2015 | |

OTHER PUBLICATIONS

International Search Report of PCT application No. PCT/JP2020/017888 dated Jun. 23, 2020.
Extended European Search Report dated Jul. 6, 2022 for the related European Patent Application No. 20813002.1.
English Translation of Chinese Office Action dated Mar. 7, 2024 for the related Chinese Patent Application No. 202080037345.8.

* cited by examiner (a)

(b)

(c)

(a)

(b)

(a)

(b)

(a)

(b)

(a)

(b)

(a) State (10)

(d) State (3)

(b) State (1)

(e) State (4)

(c) State (2)

(a) State (5)

(d) State (8)

(b) State (6)

(e) State (9)

(c) State (7)

(a) State (10)

(b) State (1)

(c) State (2)

ENERGY TRANSFER CIRCUIT AND POWER STORAGE SYSTEM

CROSS-REFERENCE TO RELATED APPLICATIONS

This application is a U.S. national stage application of the PCT International Application No. PCT/JP2020/017888 filed on Apr. 27, 2020, which claims the benefit of foreign priority of Japanese patent application No. 2019-097418 filed on May 24, 2019, the contents all of which are incorporated herein by reference.

TECHNICAL FIELD

The present invention relates to an energy transfer circuit and a power storage system that transfers energy among a plurality of cells or modules connected in series.

BACKGROUND ART

In recent years, secondary batteries such as lithium-ion batteries and nickel-metal-hydride batteries have been used for various purposes. The secondary batteries are each used for an in-vehicle (including an electric bicycle) application for supply of a power to a drive motor of an electric vehicle (EV), a hybrid electric vehicle (HEV), or a plug-in hybrid vehicle (PHV), for power storage for a peak shift or a backup, and for frequency regulation (FR) for stabilizing a frequency of a system, for example.

Generally, the secondary battery such as the lithium-ion battery executes an equalizing process for equalizing capacities among a plurality of cells connected in series from the viewpoint of maintaining power efficiency and ensuring safety. The equalizing process includes a passive method and an active method. The passive method is a method for equalizing capacities among a plurality of cells connected in series by connecting a discharge resistor to each of the plurality of cells, and discharging the other cells so as to match the voltages of the other cells with a voltage of a cell having the lowest voltage. The active method is a method for equalizing capacities among a plurality of cells connected in series by transferring energy among the plurality of cells. Although the active method has less power loss than the passive method and can reduce a heat generation amount, the passive method with a simple circuit configuration at low cost is currently the mainstream.

In recent years, a battery pack has been increased in energy capacity and output, especially in in-vehicle applications. That is, the capacity of each cell in the battery pack and a number of series connections of cells are increasing. This causes an imbalance of an energy amount among the plurality of cells to increase. Therefore, the equalizing process also increases a time required to eliminate the imbalance among the plurality of cells.

In contrast, reduction in time required for the equalizing process is required especially in the in-vehicle applications. In order to eliminate a large energy imbalance in a short time, it is necessary to apply a large current for equalization. The passive method eliminates an imbalance of energy by consuming a capacity of a cell having a high voltage using a resistor, so that increase in amount of current flowing into the resistor increases a heat generation amount. As the number of series connections of cells increases as described above, a heat dissipation area for heat generated in the resistor is less likely to be secured on a substrate. This increases need for the active method in which energy is transferred to a cell having a small capacity instead of converting the energy into heat to consume the energy. As a configuration of an active equalizing circuit, there is a configuration in which an inductor is connected between the midpoint of two cells and the midpoint of two switches connected in parallel to the two cells (see, for example, PTL 1).

The above circuit configuration is a circuit for performing energy transfer between two adjacent cells, but when three or more cells are connected in series and configured such that energy can be transferred between any two cells, the circuit configuration becomes complicated. It is necessary to provide a cell selection circuit capable of arbitrarily selecting one of a plurality of cells, or to arrange a plurality of the above circuit configurations in series and transfer energy in a bucket relay manner. In the former case, a number of wirings and switches for constituting the cell selection circuit increases. In the latter case, a number of inductors increases according to a number of series connections of cells.

When the energy transfer is performed between two cells, an external short circuit of the cell or breakdown in withstand voltage of the switch may occur due to variations in on and off timings of a plurality of corresponding switches.

On the other hand, it is conceivable to perform control to insert a period in which a current flows through a body diode of the switch between transition from an excitation state of the inductor to an active clamp state and transition from the active clamp state to a demagnetization state.

CITATION LIST

Patent Literature

PTL 1: Unexamined Japanese Patent Publication No. 7-322516

SUMMARY OF THE INVENTION

According to the study of the inventor of the present invention, it has been found that an abnormal spike occurs in an inductor current and an end-to-end voltage of the inductor depending on a control timing of the switch in the circuit adopting the above control. Noise due to this spike voltage may affect a drive signal of the switch and may cause the switch to malfunction. The breakdown in withstand voltage may occur in the switch due to this spike voltage.

The present disclosure has been made in view of such a situation, and an object of the present disclosure is to provide a technique for achieving a highly reliable and safe energy transfer circuit using an inductor.

In order to solve the above problems, an energy transfer circuit of one aspect of the present disclosure includes an inductor, a cell selection circuit that is provided between n cells connected in series, where n is an integer of 2 or more, and the inductor, and is capable of electrically connecting both ends of a selected cell including any one of the n cells or a plurality of cells connected in series and both ends of the inductor, a clamp circuit that includes clamp switches for forming a closed loop including the inductor in a state where the cell selection circuit does not select any cell, and a controller that controls the cell selection circuit and the clamp circuit. The cell selection circuit includes a first wiring that is connected to one end of the inductor, a second wiring that is connected to an other end of the inductor, a plurality of first wiring switches that selectively connect one of both the ends of the selected cell to the first wiring, and at least one second wiring switch that selectively connects an other end of both the ends of the selected cell to the second wiring. In the clamp switch, two switching elements, having diodes, are connected in series and formed in a state where the diodes are in opposite directions, the diodes each being connected or formed in parallel with corresponding one of the two switching elements, in the first wiring switch, two switching elements, having diodes, are connected in series and formed in a state where the diodes are in opposite directions, the diodes each being connected or formed in parallel with corresponding one of the two switching elements, and in the second wiring switch, two switching elements, having diodes, are connected in series and formed in a state where the diodes are in opposite directions, the diodes each being connected or formed in parallel with corresponding one of the two switching elements. The controller controls states in order of an inductor current increase state where a discharge path through which both the ends of the inductor are connected to nodes on both sides of a discharge cell which is the selected cell to be discharged among the n cells is formed by controlling electrical connection states of the first wiring switch, the second wiring switch, and the clamp switch connected to the nodes on both the sides of the discharge cell, a current flowing to the inductor from the discharge cell, and the current flowing to the inductor is increased, a clamp state where a clamp path through which both the ends of the inductor are connected via the clamp switch is formed by controlling the electrical connection states of the first wiring switch, the second wiring switch, and the clamp switch connected to the nodes of both the sides of the discharge cell, a clamp current flowing between both the ends of the inductor, and the current flowing to the inductor is circulated through the clamp path, and an inductor current decrease state where a charge path through which both the ends of the inductor are connected to nodes of both sides of a charge cell which is the selected cell to be charged among the n cells is formed by controlling electrical connection states of the first wiring switch, the second wiring switch, and the clamp switch connected to the nodes of both the sides of the charge cell, a current flowing to the charge cell from the inductor, and the current flowing to the inductor is decreased. The clamp state includes a first clamp state where a clamp current flows through a diode in parallel with at least one switching element among a plurality of switching elements forming the clamp path by turning off the at least one switching element and a second clamp state where the switching element in the off state is turned on and all the plurality of switching elements are turned on. The controller forms the clamp path in the first clamp state by turning on all of a plurality of switching elements forming the discharge path in the inductor current increase state and then turning on a part of a plurality of switching elements constituting the clamp switch before the state is switched to a next first clamp state.

According to the present disclosure, it is possible to achieve a highly reliable and safe energy transfer circuit using an inductor.

DESCRIPTION OF EMBODIMENTS

Figure 1:
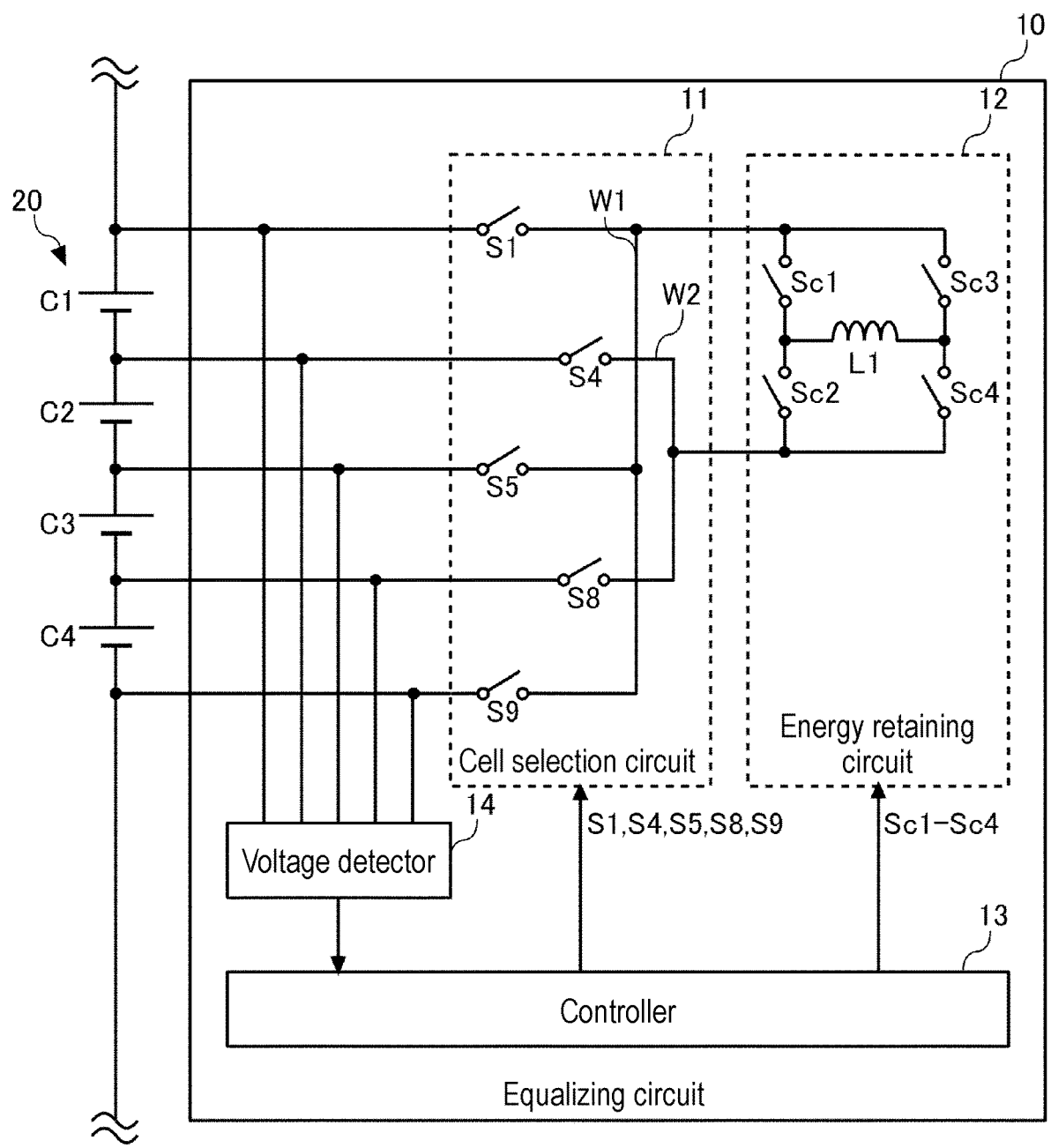
FIG. 1 is a diagram showing a configuration of a power storage system according to an exemplary embodiment.
Figure 2:
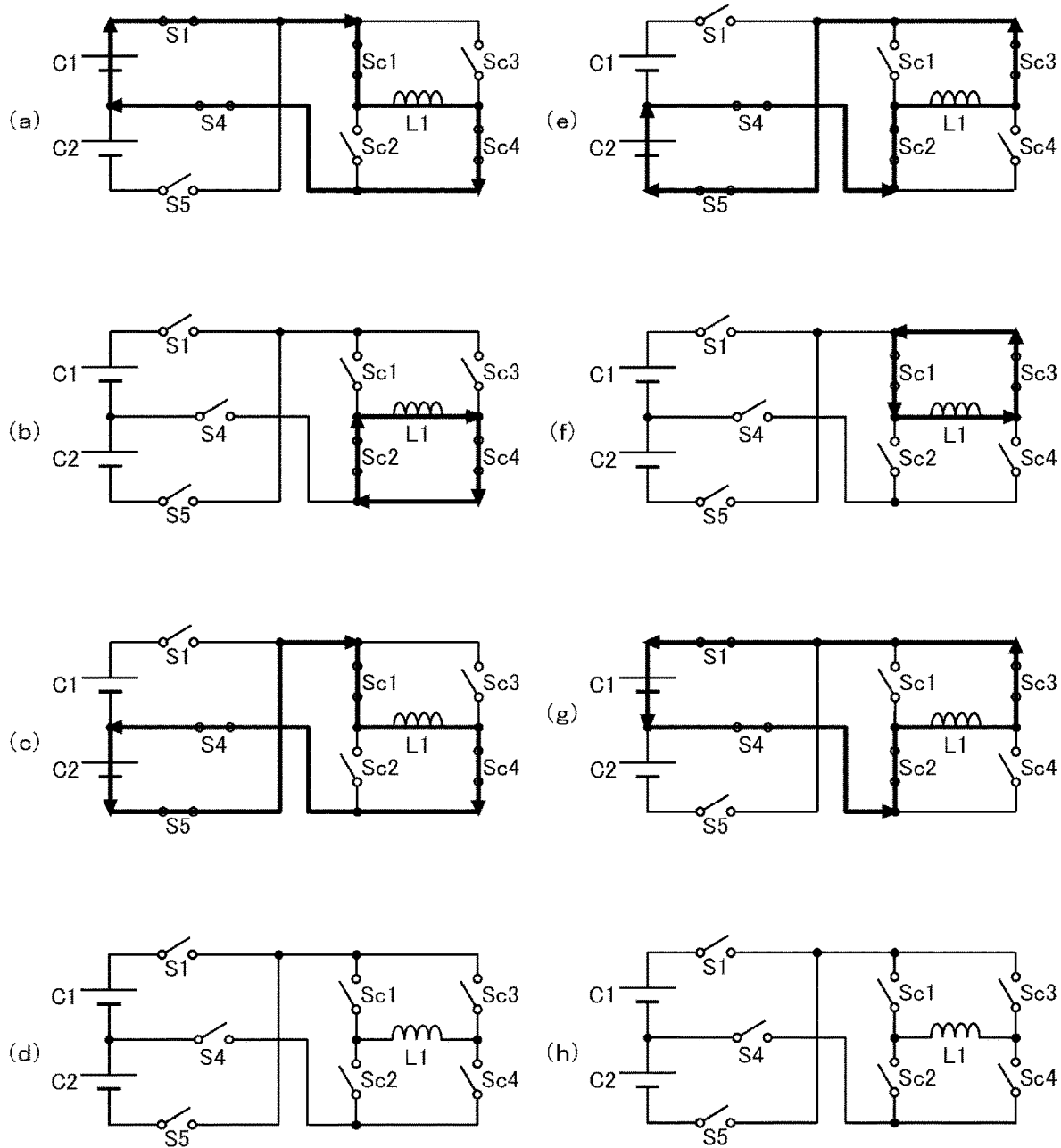
FIG. 2($a$) to ($h$) is circuit diagram for explaining a basic operation sequence example of an equalizing process of the power storage system according to the exemplary embodiment.

FIG. 1 is a diagram showing a configuration of power storage system 1 according to an exemplary embodiment. Power storage system 1 includes equalizing circuit 10 and power storage 20. Power storage 20 includes n (n is an integer of 2 or more) cells connected in series. FIG. 1 illustrates an example in which four cells C1 to C4 are connected in series. A number of cells connected in series varies according to voltage specifications required for power storage system 1.

For each cell, a rechargeable power storage element such as a lithium-ion battery cell, a nickel-metal-hydride battery cell, a lead battery cell, an electric double layer capacitor cell, and a lithium ion capacitor cell is available. Hereinafter, an example using a lithium-ion battery cell (nominal voltage: 3.6 to 3.7V) is assumed in the description.

Equalizing circuit 10 includes voltage detector 14, cell selection circuit 11, energy retaining circuit 12, and controller 13. Voltage detector 14 detects a voltage of each of n (four in FIG. 1) cells connected in series. Specifically, voltage detector 14 is connected to nodes of n cells connected in series by (n+1) voltage lines, and detects a voltage between two adjacent voltage lines, thereby detecting a voltage of each cell. Voltage detector 14 can be configured with, for example, a general-purpose analog front-end integrated circuit (IC) or an application specific integrated circuit (ASIC). Voltage detector 14 converts the detected voltage of each of the cells into a digital value and outputs the digital value to controller 13.

Cell selection circuit 11 is a circuit provided between the n cells connected in series and inductor L1 included in energy retaining circuit 12, and capable of electrically connecting both ends of a cell selected from among the n cells to both ends of inductor L1. Cell selection circuit 11 includes first wiring W1 connected to a first end of inductor L1, second wiring W2 connected to a second end of inductor L1, a plurality of first wiring switches, and at least one second wiring switch.

The plurality of first wiring switches are connected between odd-numbered nodes and first wiring W1 among nodes (n+1) of the n cells connected in series. At least one second wiring switch is connected between even-numbered nodes and second wiring W2 among the nodes (n+1) of the n cells connected in series.

In the example shown in FIG. 1, n=4 and the number of nodes=5, and cell selection circuit 11 has three first wiring switches and two second wiring switches. In FIG. 1, first switch S1, fifth switch S5, and ninth switch S9 are the first wiring switches, and fourth switch S4 and eighth switch S8 are the second wiring switches.

Energy retaining circuit 12 (also referred to as a clamp circuit) includes inductor L1, first clamp switch Sc1, second clamp switch Sc2, third clamp switch Sc3, and fourth clamp switch Sc4. First clamp switch Sc1, second clamp switch Sc2, third clamp switch Sc3, and fourth clamp switch Sc4 form a full bridge circuit. Specifically, a first arm in which first clamp switch Sc1 and second clamp switch Sc2 are connected in series, and a second arm in which third clamp switch Sc3 and fourth clamp switch Sc4 are connected in series are connected in parallel between first wiring W1 and second wiring W2. Inductor L1 is connected between a node between first clamp switch Sc1 and second clamp switch Sc2 and a node between third clamp switch Sc3 and fourth clamp switch Sc4.

First clamp switch Sc1 to fourth clamp switch Sc4 can electrically connect both the ends of inductor L1 in energy retaining circuit 12. Specifically, in a state where cell selection circuit 11 does not select any cell, first clamp switch Sc1 and third clamp switch Sc3 are controlled to an electrical connection state, and second clamp switch Sc2 and fourth clamp switch Sc4 are controlled to an electrical non-connection state, or first clamp switch Sc1 and third clamp switch Sc3 are controlled to an electrical non-connection state, and second clamp switch Sc2 and fourth clamp switch Sc4 are controlled to an electrical connection state, and thereby a closed loop including inductor L1 can be formed in energy retaining circuit 12.

First clamp switch Sc1 to fourth clamp switch Sc4 can switch a direction of a current flowing to inductor L1. Specifically, in a state where cell selection circuit 11 selects any cell, first clamp switch Sc1 and fourth clamp switch Sc4 are controlled to an electrical connection state, and second clamp switch Sc2 and third clamp switch Sc3 are controlled to an electrical non-connection state, or first clamp switch Sc1 and fourth clamp switch Sc4 are controlled to an electrical non-connection state, and second clamp switch Sc2 and third clamp switch Sc3 are controlled to an electrical connection state, and thereby the direction of the current flowing to inductor L1 can be switched.

Controller 13 executes an equalizing process among the n cells connected in series based on the voltages of the n cells, the voltages being detected by voltage detector 14. Controller 13 can be, for example, a microcomputer. Controller 13 and voltage detector 14 may be integrated into one chip.

In the present exemplary embodiment, controller 13 executes an equalizing process among the n cells connected in series by an active cell balance method. In the active cell balance method according to the present exemplary embodiment, energy is transferred from one cell (cell to be discharged) to another cell (cell to be charged) among the n cells connected in series to equalize capacities of one cell and the other cell. Repeating this energy transfer equalizes capacities among the n cells connected in series.

First, controller 13 controls first clamp switch Sc1 and fourth clamp switch Sc4 to an electrical connection state and second clamp switch Sc2 and third clamp switch Sc3 to an electrical non-connection state, or controls first clamp switch Sc1 and fourth clamp switch Sc4 to an electrical non-connection state and controls second clamp switch Sc2 and third clamp switch Sc3 to an electrical connection state, and controls cell selection circuit 11 to electrically connect both ends of the cell to be discharged among the n cells and both the ends of inductor L1 for a predetermined time. Thus, a discharge path is formed. In a state where the discharge path is formed, a current flows between the cell to be discharged and inductor L1, and a state where a current flows from the cell to be discharged to inductor L1 (also referred to as an inductor increase state) occurs, and energy is stored in inductor L1.

Subsequently, controller 13 controls cell selection circuit 11 to electrically shut off the n cells and inductor L1, and controls first clamp switch Sc1 and third clamp switch Sc3 to an electrical connection state, and second clamp switch Sc2 and fourth clamp switch Sc4 to an electrical non-connection state, or controls first clamp switch Sc1 and third clamp switch Sc3 to an electrical non-connection state, and second clamp switch Sc2 and fourth clamp switch Sc4 to an electrical connection state. Thus, a clamp path is formed. In this clamp state, a circulating current flows through the closed loop, and an inductor current is actively clamped in energy retaining circuit 12.

Subsequently, controller 13 controls first clamp switch Sc1 and fourth clamp switch Sc4 to an electrical connection state, and second clamp switch Sc2 and third clamp switch Sc3 to an electrical non-connection state, or controls first clamp switch Sc1 and fourth clamp switch Sc4 to an electrical non-connection state, and second clamp switch Sc2 and third clamp switch Sc3 to an electrical connection state, and controls cell selection circuit 11 to electrically control both ends of the cell to be charged among the n cells and both the ends of inductor L1 for a predetermined time. Thus, a charge path is formed. In a state where the charge path is formed, a current flows between the cell to be charged and inductor L1, and a state where an inductor current actively clamped in energy retaining circuit 12 flows in the cell to be charged (also referred to as an inductor current decrease state) occurs. Accordingly, the energy transfer from one cell to another is completed.

FIG. 2(a) to (h) is circuit diagram for explaining a basic operation sequence example of the equalizing process of power storage system 1 according to the exemplary embodiment. In the present basic operation sequence example, the number of series connections of cells is set to two for the sake of simplicity of explanation. In a first state shown in FIG. 2(a), controller 13 controls first switch S1, first clamp switch Sc1, fourth clamp switch Sc4, and fourth switch S4 to an electrical connection state, and controls fifth switch S5, second clamp switch Sc2, and third clamp switch Sc3 to an electrical non-connection state. Thus, a discharge path is formed. In this discharge state, a current flows from first cell C1 to inductor L1, and the energy discharged from first cell C1 is stored in inductor L1.

In a second state shown in FIG. 2(b), controller 13 controls second clamp switch Sc2 and fourth clamp switch Sc4 to an electrical connection state, and controls first switch S1, fourth switch S4, fifth switch S5, first clamp switch Sc1, and third clamp switch Sc3 to an electrical non-connection state. Thus, a clamp path is formed. In this clamp state, the energy stored in inductor L1 flows as the inductor current in the closed loop and is actively clamped.

In a third state shown in FIG. 2(c), controller 13 controls fourth clamp switch Sc4, fourth switch S4, fifth switch S5, and first clamp switch Sc1 to an electrical connection state, and controls first switch S1, second clamp switch Sc2, and third clamp switch Sc3 to an electrical non-connection state. Thus, a charge path is formed. In this charge state, the inductor current actively clamped in the closed loop flows to second cell C2 to charge second cell C2.

In a fourth state shown in FIG. 2(d), controller 13 controls first switch S1, fourth switch S4, fifth switch S5, and first clamp switch Sc1 to fourth clamp switch Sc4 to an electrical non-connection state. In this state, the energy transfer from first cell C1 to second cell C2 is completed. The description performed so far is the description of a mode in which the current of inductor L1 is not inverted (a mode in which the current is not commutated). When the discharge from second cell C2 is started simultaneously with the completion of the charge of second cell C2 (commutation mode), the fourth state shown in FIG. 2(d) is omitted. The current of inductor L1 becomes zero at the moment of commutation, and the state is changed from FIG. 2(c) to FIG. 2(e) in which the current of inductor L1 is inverted.

In a fifth state shown in FIG. 2(e), controller 13 controls fourth switch S4, second clamp switch Sc2, third clamp switch Sc3, and fifth switch S5 to an electrical connection state, and controls first switch S1, first clamp switch Sc1, and fourth clamp switch Sc4 to an electrical non-connection state. Thus, a discharge path is formed. In this discharge state, a current flows from second cell C2 to inductor L1, and the energy discharged from second cell C2 is stored in inductor L1.

In a sixth state shown in FIG. 2(f), controller 13 controls first clamp switch Sc1 and third clamp switch Sc3 to an electrical connection state, and controls first switch S1, fourth switch S4, fifth switch S5, second clamp switch Sc2, and third clamp switch Sc3 to an electrical non-connection state. Thus, a clamp path is formed. In this clamp state, the energy stored in inductor L1 flows as the inductor current in the closed loop and is actively clamped.

In a seventh state shown in FIG. 2(g), controller 13 controls third clamp switch Sc3, first switch S1, fourth switch S4, and second clamp switch Sc2 to an electrical connection state, and controls fifth switch S5, first clamp switch Sc1, and fourth clamp switch Sc4 to an electrical non-connection state. Thus, a charge path is formed. In this charge state, the inductor current actively clamped in the closed loop flows to first cell C1 to charge first cell C1.

In an eighth state shown in FIG. 2(h), controller 13 controls first switch S1, fourth switch S4, fifth switch S5, and first clamp switch Sc1 to fourth clamp switch Sc4 to an electrical non-connection state. In this state, the energy transfer from second cell C2 to first cell C1 is completed.

In the second or sixth state, the inductor current is actively clamped in the closed loop to ensure the continuity of the inductor current, which enables safe and reliable switch switching of cell selection circuit 11.

Figure 3:
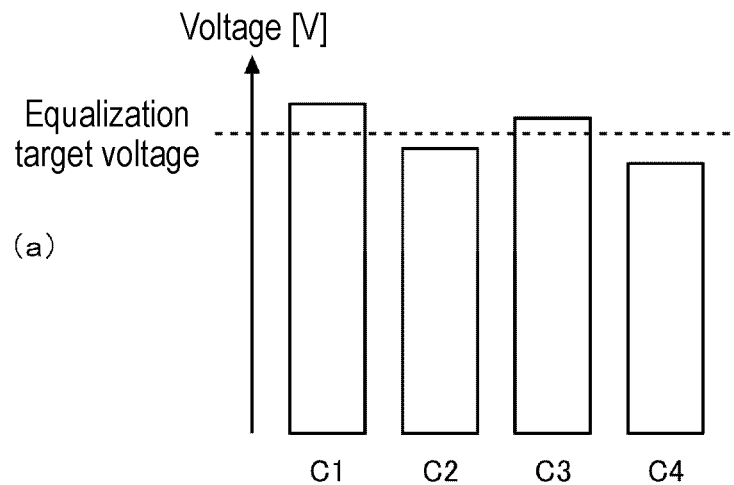
FIG. 3($a$) to ($c$) is diagram for explaining a specific example of the equalizing process of the power storage system according to the exemplary embodiment.
Figure 3:
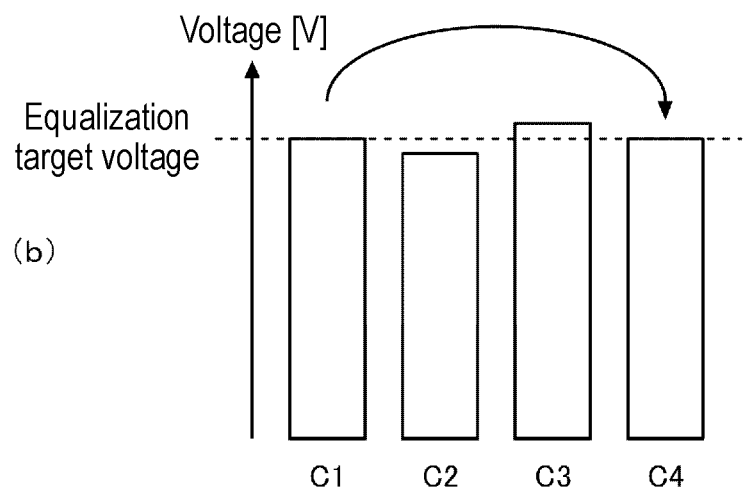
Figure 3:
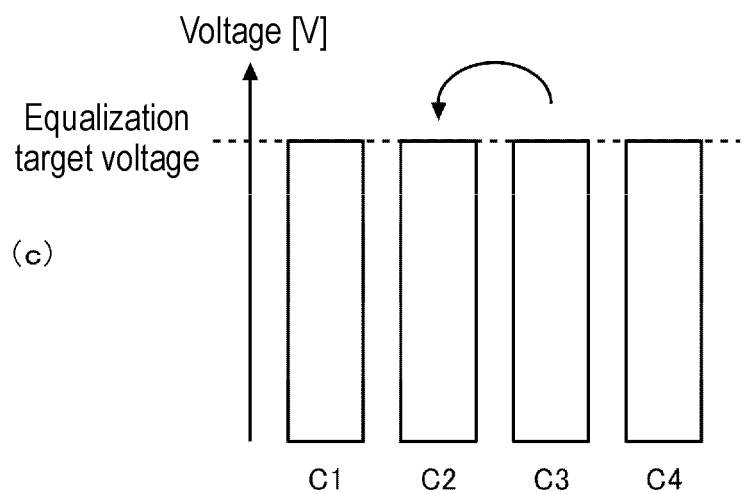

FIG. 3(a) to (c) is diagram for showing a specific example of the equalizing process of power storage system 1 according to the exemplary embodiment. In this specific example, an example in which four cells C1 to C4 are connected in series is assumed. FIG. 3(a) is a diagram schematically showing voltage states of first cell C1 to fourth cell C4 before start of the equalizing process. Controller 13 calculates an average value of voltages of first cell C1 to fourth cell C4 detected by voltage detector 14, and sets the calculated average value as an equalization target voltage (hereinafter, simply referred to as a target voltage).

Controller 13 transfers energy from a cell with a voltage higher than the target voltage to a cell with a voltage lower than the target voltage. For example, energy is transferred from a cell with a highest voltage among cells with voltages higher than the target voltage (first cell C1 in FIG. 3(a)) to a cell with a lowest voltage among cells with voltages lower than the target voltage (fourth cell C4 in FIG. 3(a)).

Controller 13 determines an energy transfer amount within a range in which a transfer source cell (cell to be discharged) has a voltage equal to or higher than the target voltage and a transfer destination cell (cell to be charged) has a voltage less than or equal to the target voltage. Controller 13 determines a discharge time of the transfer source cell and a charge time of the transfer destination cell based on the determined energy transfer amount and a discharge current and a charge current based on the design. Assuming that an energy amount consumed while the inductor current is actively clamped in energy retaining circuit 12 can be ignored, the discharge time of the transfer source cell is basically equal to the charge time of the transfer destination cell.

FIG. 3(b) illustrates a state where energy transfer from first cell C1 being the transfer source cell to fourth cell C4 being the transfer destination cell is completed. Controller 13 executes the above-described processing again. Specifically, energy is transferred from the cell with the highest voltage among cells with the voltage higher than the target voltage (third cell C3 in FIG. 3(b)) to the cell with the lowest voltage among cells with the voltage lower than the target voltage (second cell C2 in FIG. 3(b)).

FIG. 3(c) illustrates a state where energy transfer from third cell C3 being the source cell to second cell C2 being the destination cell is completed. As described above, the equalizing process of first cell C1 to fourth cell C4 connected in series is completed.

In the specific example shown in FIG. 3(a) to (c), first, the average value of the voltages of the plurality of cells connected in series is calculated, and the target value is set. In this regard, an algorithm without setting the target value is also available. At each time point, controller 13 transfers energy from the cell with the highest voltage among the plurality of cells connected in series to the cell with the lowest voltage to equalize voltages of the two cells. Controller 13 repeatedly executes this processing until the voltages of the plurality of cells connected in series are all equalized.

Further, in the above specific example, although the example of using a voltage as the equalization target value has been described, an actual capacity, a dischargeable capacity, or a rechargeable capacity may be used instead of the voltage.

It is advantageous to use a metal-oxide-semiconductor field-effect transistor (MOSFET) with a relatively high switching speed and relatively low cost for a plurality of switches included in cell selection circuit 11 and four clamp switches included in energy retaining circuit 12. In an N-channel MOSFET, a parasitic diode (body diode) is formed in a direction from a source to a drain. Therefore, in applications where a current may flow in from both a source terminal and a drain terminal, it is common to connect two MOSFETs in series in opposite directions and use the MOSFETs as a bidirectional switch.

Figure 4:
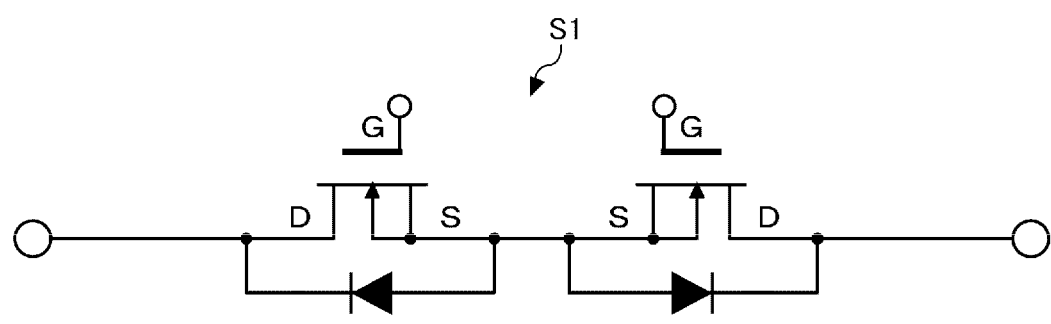
FIGS. 4($a$) and ($b$) is diagram showing a circuit configuration example when a first switch includes two N-channel metal-oxide-semiconductor field-effect transistors (MOSFETs).
Figure 4:
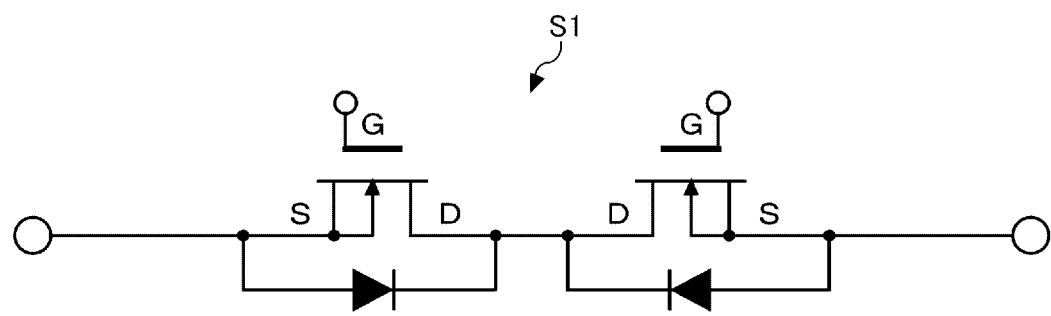

FIG. 4(a) to (b) is diagram showing a circuit configuration example when first switch S1 includes two N-channel MOSFETs. FIG. 4(a) shows an example in which source terminals of two N-channel MOSFETs are connected to each other to form a bidirectional switch. In this case, since anodes of two body diodes in series face each other, a current is prevented from flowing through the body diodes between both ends of the bidirectional switch.

FIG. 4(b) shows an example in which drain terminals of two N-channel MOSFETs are connected to each other to form a bidirectional switch. In this case, since cathodes of two body diodes in series face each other, a current is prevented from flowing through the body diodes between both ends of the bidirectional switch.

Comparing the configuration example of FIG. 4(a) and the configuration example of FIG. 4(b), the configuration example of FIG. 4(a) has an advantage that power source circuits (DC/DC converters) of gate drivers of the two N-channel MOSFETs can be shared. In the configuration example shown in FIG. 4(a), since a source potential is common in the two N-channel MOSFETs, power source voltages of the two gate drivers can be shared. Therefore, the power source circuits (DC/DC converters) that supply the power source voltages to the two gate drivers can also be shared. As a result, the cost and the circuit area can be reduced. On the other hand, in the configuration example shown in FIG. 4(b), since the source potential of the two N-channel MOSFETs cannot be shared, it is necessary to separately provide the power source circuits (DC/DC converters) that supply the power source voltages to the two gate drivers.

Figure 5:
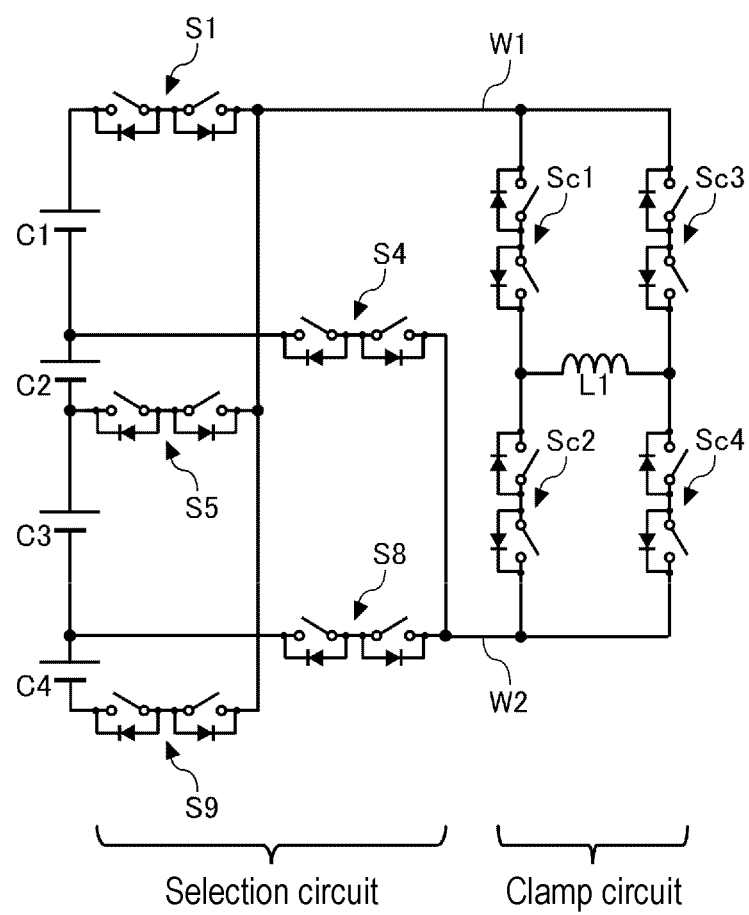
FIG. 5 is a diagram showing a circuit configuration example when a bidirectional switch shown in the configuration example of FIG. 4($a$) is used for a switch of the power storage system according to the exemplary embodiment.

FIG. 5 is a diagram showing a circuit configuration example when the bidirectional switch shown in the configuration example of FIG. 4(a) is used for the switch of power storage system 1 according to the exemplary embodiment. In the example shown in FIG. 5, the bidirectional switch shown in the configuration example of FIG. 4(a) is used for each of first switch S1, fourth switch S4, fifth switch S5, eighth switch S8, ninth switch S9, first clamp switch Sc1, second clamp switch Sc2, third clamp switch Sc3, and fourth clamp switch Sc4.

Figure 6:
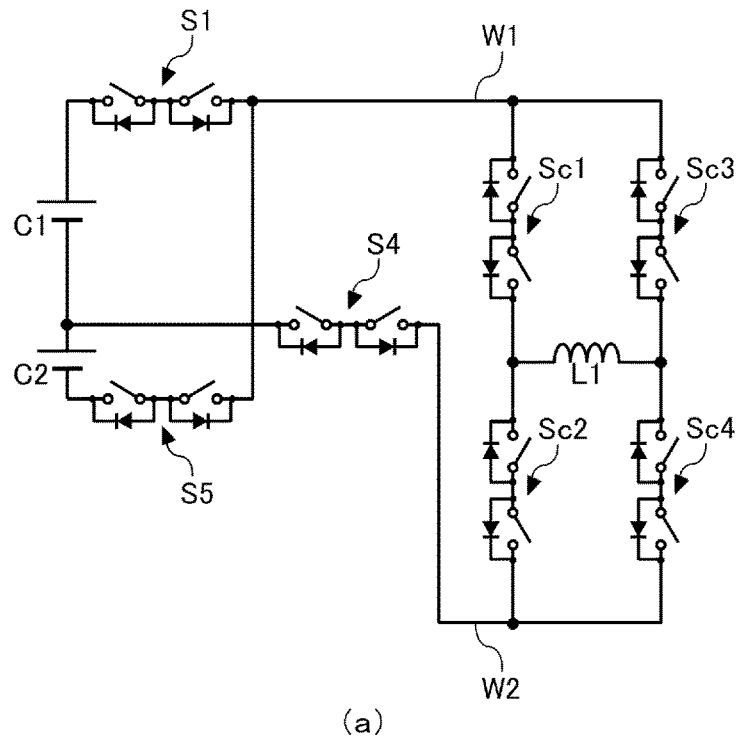
FIGS. 6($a$) and ($b$) is diagram obtained by extracting a path used for energy transfer between two cells in the circuit configuration example of the power storage system shown in FIG. 5.
Figure 6:
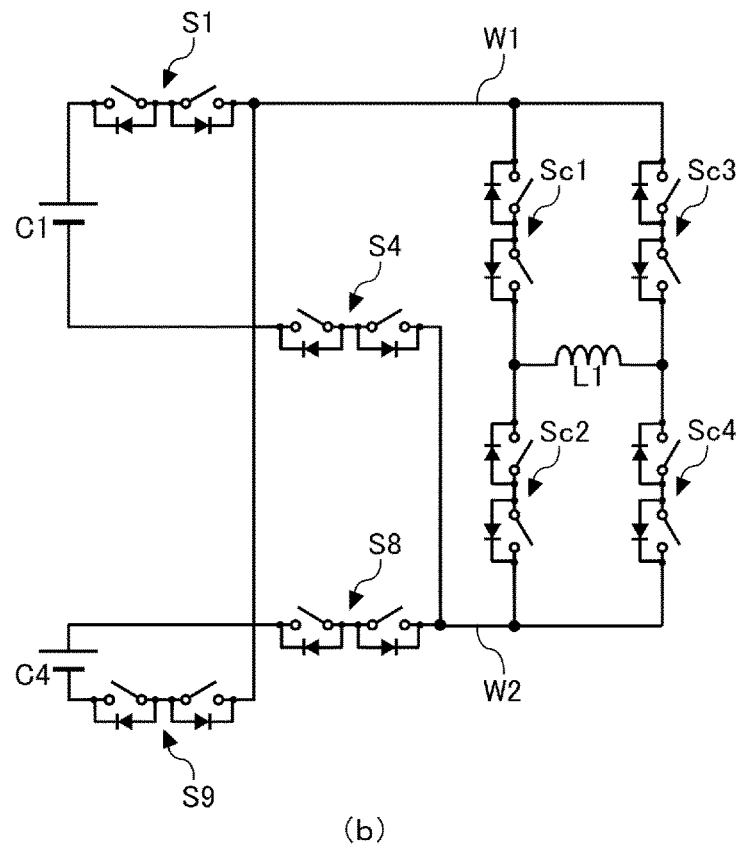

FIGS. 6(a) and (b) is diagram obtained by extracting a path used for energy transfer between two cells in the circuit configuration example of power storage system 1 shown in FIG. 5. FIG. 6(a) is a diagram obtained by extracting the path used for the energy transfer between first cell C1 and second cell C2. In the energy transfer between first cell C1 and second cell C2, a path passing through eighth switch S8 and a path passing through ninth switch S9 are not used. FIG. 6(b) is a diagram obtained by extracting the path used for the energy transfer between first cell C1 and fourth cell C4. In the energy transfer between first cell C1 and fourth cell C4, a path passing through fifth switch S5 is not used.

Figure 7:
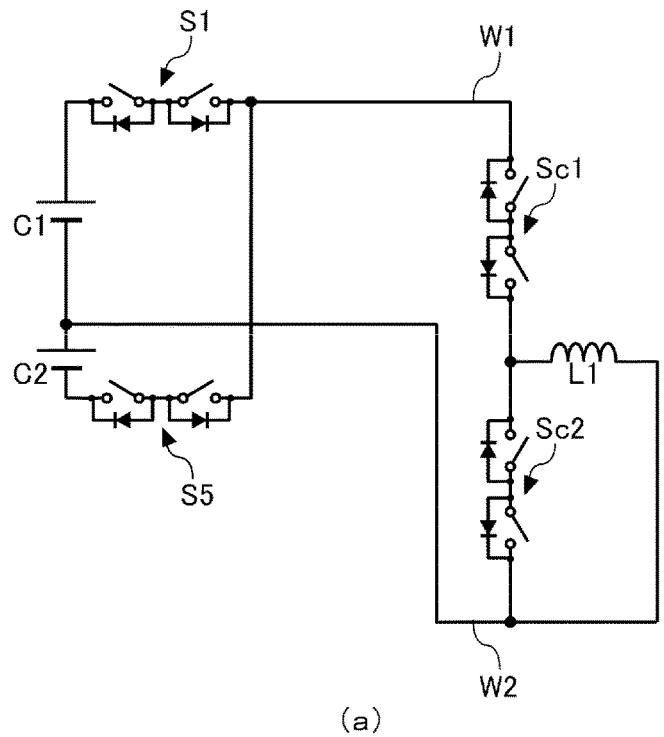
FIGS. 7($a$) and ($b$) is diagram in which switches whose on and off states do not change during energy transfer between two cells are omitted in the circuit configuration example of the power storage system shown in FIGS. 6($a$) and ($b$).
Figure 7:
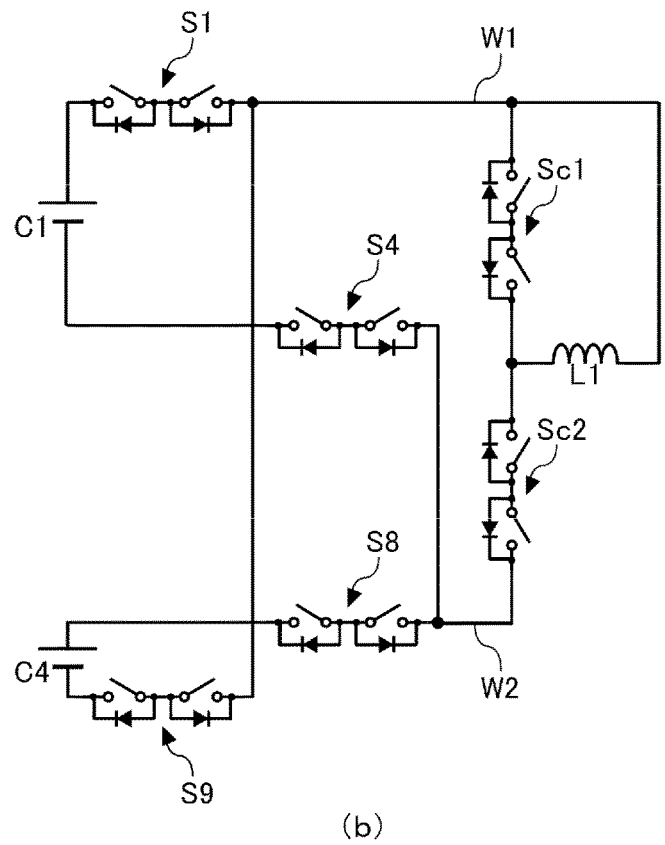

FIGS. 7(a) and (b) is diagram in which switches whose on or off states do not change during energy transfer between two cells are omitted in the circuit configuration example of power storage system 1 shown in FIGS. 6(a) and (b). FIG. 7(a) is a diagram in which a switch whose on or off state does not change during energy transfer between first cell C1 and second cell C2 is omitted. In the energy transfer between first cell C1 and second cell C2, fourth switch S4 and fourth clamp switch Sc4 are drawn as simple connection since the fourth switch and the fourth clamp switch are constantly in the on state, and third clamp switch Sc3 is drawn as connection itself omitted since the third clamp switch is constantly in the off state. In FIG. 7(a), when energy is transferred from first cell C1 to inductor L1, first switch S1 and first clamp switch Sc1 are turned on, and fifth switch S5 and second clamp switch Sc2 are turned off. In this state, since a current flows from first cell C1 to inductor L1, energy is transferred from first cell C1 to inductor L1. Energy is stored in inductor L1 by this energy transfer, and first clamp switch Sc1 is turned off, and second clamp switch Sc2 is turned on. Thus, a clamp state of inductor L1 is formed. Subsequently, when energy is transferred from inductor L1 to second cell C2, fifth switch S5 and first clamp switch Sc1 are turned on, and first switch S1 and second clamp switch Sc2 are turned off. In this state, the energy stored in the clamp state that retains the energy of inductor L1 is transferred from inductor L1 to second cell C2. When a current flowing to inductor L1 becomes zero, the energy transfer is completed by turning off eighth switch S8 and ninth switch S9.

FIG. 7(b) is a diagram in which a switch whose on or off state does not change during energy transfer between first cell C1 and fourth cell C4 is omitted. In FIG. 7(b), when energy is transferred from first cell C1 to inductor L1, first switch S1, fourth switch S4, and second clamp switch Sc2 are turned on, and eighth switch S8, ninth switch S9, and first clamp switch Sc1 are turned off. In this state, since a current flows from first cell C1 to inductor L1, energy is transferred from first cell C1 to inductor L1. Energy is stored in inductor L1 by this energy transfer, and second clamp switch Sc2 is turned off, and first clamp switch Sc1 is turned on. Thus, a clamp state of inductor L1 is formed. Subsequently, when energy is transferred from inductor L1 to first cell C4, eighth switch S8, ninth switch S9, and second clamp switch Sc2 are turned on, and first switch S1, fourth switch S4, and first clamp switch Sc1 are turned off. In this state, the energy stored in the clamp state that retains the energy of inductor L1 is transferred from inductor L1 to fourth cell C4. When a current flowing to inductor L1 becomes zero, the energy transfer is completed by turning off eighth switch S8 and ninth switch S9. Although FIGS. 7(a) and (b) is described in a mode in which the current of inductor L1 is not inverted (mode in which the current is not commutated), the inductor may operate in the commutation mode as described in FIG. 2. Hereinafter, an operation based on the commutation mode will be described with reference to FIGS. 9 and 10.

Figure 8:
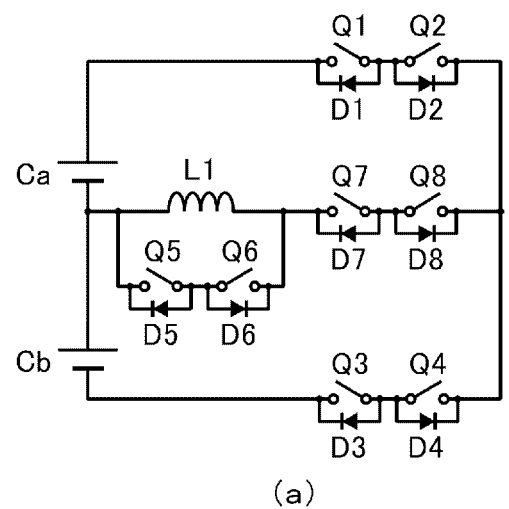
FIG. 8($a$) is a diagram showing a circuit configuration example of the power storage system shown in FIG. 7($a$) in an organized manner for unified description, and FIG. 8($b$) is a diagram showing a variation of FIG. 8($a$).
Figure 8:
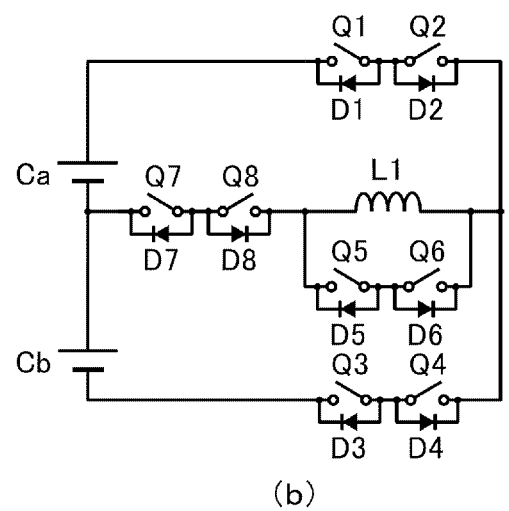

FIGS. 8(a) and (b) is diagram showing a circuit configuration example of power storage system 1 in which the discharge path and the charge path are formed when energy is transferred from the cell to be discharged to the cell to be charged in an organized manner for unified description. In the circuit configuration example of power storage system 1 shown in FIG. 8(a), eight switching elements Q1 to Q8 are used. A first switching element group in which first switching element Q1 having first body diode D1 and second switching element Q2 having second body diode D2 are connected in series as a pair in opposite directions is connected to a positive-electrode terminal of upper cell Ca. A second switching element group in which third switching element Q3 having third body diode D3 and fourth switching element Q4 having fourth body diode D4 are connected in series as a pair in opposite directions is connected to a negative-electrode terminal of lower cell Cb.

A negative-electrode terminal of upper cell Ca and a positive-electrode terminal of lower cell Cb are connected to the first end of inductor L1. A third switching element group in which fifth switching element Q5 having fifth body diode D5 and sixth switching element Q6 having sixth body diode D6 are connected in series as a pair in opposite directions is connected between both the ends of inductor L1. A fourth switching element group in which seventh switching element Q7 having seventh body diode D7 and eighth switching element Q8 having eighth body diode D8 are connected in series as a pair in opposite directions are connected between the second end of inductor L1 and a node between the first switching element group and the second switching element group.

The first switching element group including first switching element Q1 and second switching element Q2 corresponds to first switch S1 in FIG. 7(a). The second switching element group including third switching element Q3 and fourth switching element Q4 corresponds to fifth switch S5 in FIG. 7(a). The third switching element group including fifth switching element Q5 and sixth switching element Q6 corresponds to second clamp switch Sc2 in FIG. 7(a). The fourth switching element group including seventh switching element Q7 and eighth switching element Q8 corresponds to first clamp switch Sc1 in FIG. 7(a). In power storage system 1 having the above-described configuration and shown in FIG. 8(a), ten steps are controlled as one cycle.

In the circuit configuration example of power storage system 1 shown in FIG. 8(b), eight switching elements Q1 to Q8 are used. The circuit configuration example shown in FIG. 8(b) is different from the circuit configuration example shown in FIG. 8(a) in that positions of a parallel circuit of inductor L1 and the third switching element group (fifth switching element Q5 and sixth switching element Q6) and the fourth switching element group (seventh switching element Q7 and eighth switching element Q8) are switched.

In the control to be described below, the description will be given by using the circuit configuration example shown in FIG. 8(a).

Figure 10:
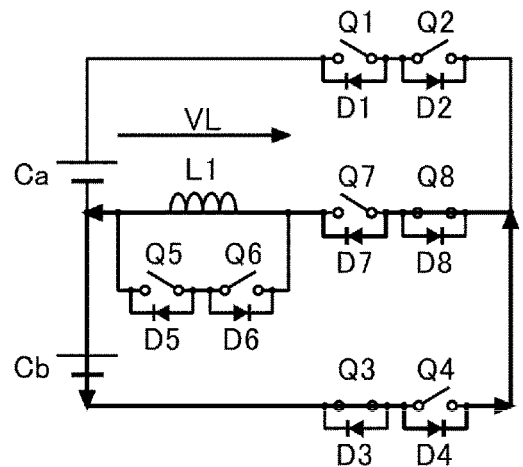
FIG. 10($a$) to ($e$) is diagram showing a circuit state in control according to the comparative example of the power storage system shown in FIG. 8($a$) (part 2).
Figure 10:
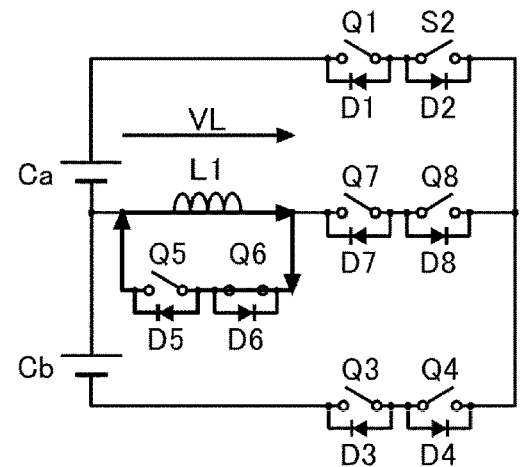
Figure 10:
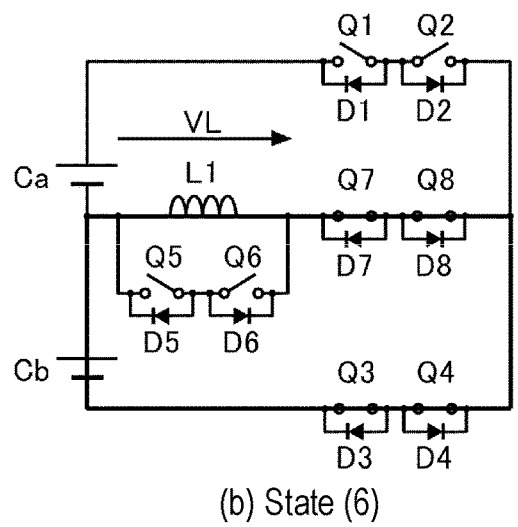
Figure 10:
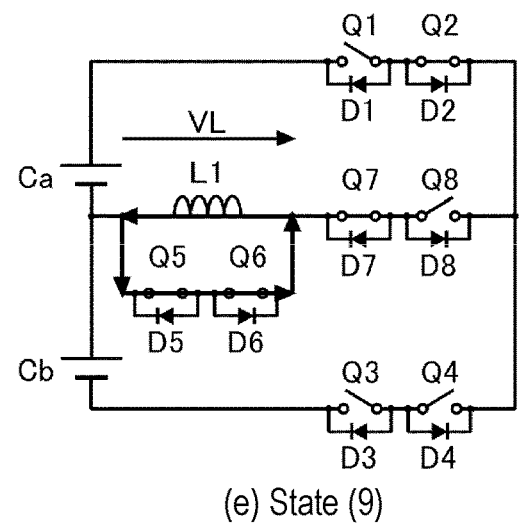
Figure 10:
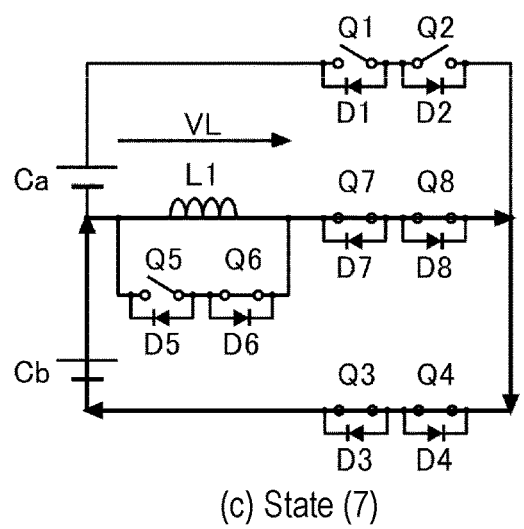
Figure 11:
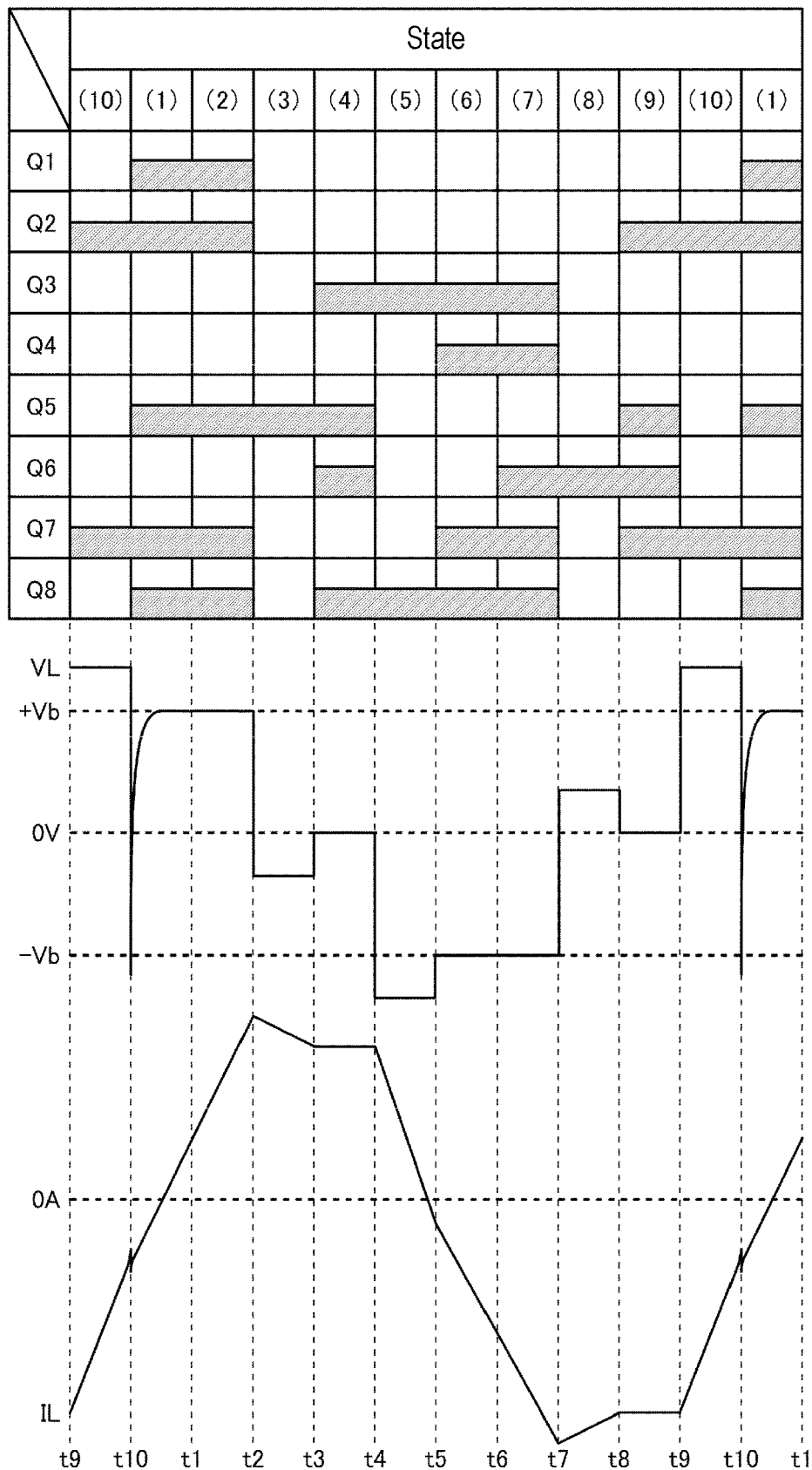
FIG. 11 is a diagram showing a switching pattern of eight switching elements, a time transition of an end-to-end voltage of an inductor, and a current of the inductor in the control according to the comparative example of the power storage system shown in FIG. 8($a$).

FIG. 9(a) to (e) and FIG. 10(a) to (e) are two diagrams showing a circuit state in the control of all the ten steps according to a comparative example of power storage system 1 shown in FIG. 8(a) in correspondence with current IL of inductor L1 (state transition of ten steps in total). FIG. 11 is a diagram showing a switching pattern of eight switching elements Q1 to Q8, a time transition of end-to-end voltage VL of inductor L1, and current IL of inductor L1 in the control according to the comparative example of power storage system 1 shown in FIG. 8(a). In current IL of inductor L1, an arrow direction shown in FIG. 9(a) is represented as positive, and an opposite direction of the arrow is represented as negative.

As shown in FIG. 9(b), in state (1), controller 13 controls first switching element Q1, second switching element Q2, fifth switching element Q5, seventh switching element Q7, and eighth switching element Q8 to an on state, and controls third switching element Q3, fourth switching element Q4, and sixth switching element Q6 to an off state. A case where fifth switching element Q5 is controlled to an on state is in preparation for a next clamp period.

As shown in FIG. 9(c), in state (2), controller 13 maintains the switching pattern of state (1). In state (2), a discharge current flows from upper cell Ca to inductor L1.

As shown in FIG. 9(d), in state (3), controller 13 turns off first switching element Q1, second switching element Q2, seventh switching element Q7, and eighth switching element Q8. In state (3), a current flows through a clamp path formed by inductor L1- ➤ fifth switching element Q5- ➤ sixth body diode D6- ➤ inductor L1.

As shown in FIG. 9(e), in state (4), controller 13 turns off fifth switching element Q5, and turns on third switching element Q3 and eighth switching element Q8 in preparation for a next charge period. In state (4), a current flows through a clamp path formed by inductor L1- ➤ fifth switching element Q5- ➤ sixth switching element Q6- ➤ inductor L1.

Comparing the clamp path shown in state (3) with the clamp path shown in state (4), since the current passes through sixth body diode D6 in the former, a loss corresponding to forward drop voltage Vf of sixth body diode D6 occurs. Accordingly, the state is switched from state (3) to state (4) in order to reduce an energy loss.

State (3) is provided for smooth and safe transition from the discharge state to the clamp state. For example, when the turning-on of fifth switching element Q5 and sixth switching element Q6 and the turning-off of first switching element Q1, second switching element Q2, seventh switching element Q7, and eighth switching element Q8 are simultaneously executed, an external short circuit may occur in upper cell Ca or breakdown in withstand voltage may occur in first switching element Q1 or eighth switching element Q8 due to a shift in switching timing.

Specifically, when a state where all fifth switching element Q5, sixth switching element Q6, first switching element Q1, second switching element Q2, seventh switching element Q7, and eighth switching element Q8 are turned on appears, an external short circuit occurs in upper cell Ca. When fifth switch S5 and the sixth switch S6 are in the off state and the turning-off of first switching element Q1 is earlier than the turning-off of second switching element Q2, seventh switching element Q7, and eighth switching element Q8, breakdown in withstand voltage occurs in first switching element Q1. When the turning-off of eighth switching element Q8 is earlier than the turning-off of first switching element Q1, second switching element Q2, and seventh switching element Q7, breakdown in withstand voltage occurs in eighth switching element Q8. On the other hand, in state (3), since sixth body diode D6 is electrically connected, it is possible to prevent the external short circuit of the cell or the breakdown in withstand voltage of the switching element.

As shown in FIG. 10(a), in state (5), controller 13 turns off fifth switching element Q5 and sixth switching element Q6. In state (5), a charge current flows through a path formed by inductor L1- ➤ lower cell Cb- ➤ third switching element Q3- ➤ fourth body diode D4- ➤ eighth switching element Q8- ➤ seventh body diode D7- ➤ inductor L1.

As shown in FIG. 10(b), in state (6), controller 13 turns on fourth switching element Q4 and seventh switching element Q7. In state (6), a charge current flows through a path formed by inductor L1- ➤ lower cell Cb- ➤ third switching element Q3- ➤ fourth switching element Q4- ➤ eighth switching element Q8->seventh switching element Q7->inductor L1. Comparing the path shown in FIG. 10(a) with the path shown in FIG. 10(b), since the current passes through fourth body diode D4 and seventh body diode D7 in the former, a loss of 2 Vf in total corresponding to forward drop voltage Vf of fourth body diode D4 and a loss corresponding to forward drop voltage Vf of seventh body diode D7 occur. Accordingly, the state is switched from state (5) to state (6) in order to reduce the energy loss.

State (5) is provided for smooth and safe transition from the clamp state to the charge state. For example, when the turning-off of fifth switching element Q5 and sixth switching element Q6 and the turning-on of third switching element Q3, fourth switching element Q4, seventh switching element Q7, and eighth switching element Q8 are simultaneously executed, an external short circuit may occur in lower cell Cb or breakdown in withstand voltage may occur in third switching element Q3 or eighth switching element Q8 due to a shift in switching timing. On the other hand, in state (5), since fourth body diode D4 and seventh body diode D7 are electrically connected, it is possible to prevent the external short circuit of the cell or the breakdown in withstand voltage of the switching element.

In state (6), when the energy released from inductor L1 to lower cell Cb disappears, the direction of the current is inverted, and the discharge current starts to flow from lower cell Cb to inductor L1.

As shown in FIG. 10(c), in state (7), controller 13 turns on sixth switching element Q6 in preparation for a next clamp period.

As shown in FIG. 10(d), in state (8), controller 13 turns off third switching element Q3, fourth switching element Q4, seventh switching element Q7, and eighth switching element Q8. In state (8), a current flows through a clamp path formed by inductor L1->sixth switching element Q6->fifth body diode D5->inductor L1.

As shown in FIG. 10(e), in state (9), controller 13 turns on fifth switching element Q5, and turns on second switching element Q2 and seventh switching element Q7 in preparation for a next charge period. In state (9), a current flows through a clamp path formed by inductor L1->fifth switching element Q5->sixth switching element Q6->inductor L1.

Comparing the clamp path shown in state (8) with the clamp path shown in state (9), since the current passes through fifth body diode D5 in the former, a loss corresponding to forward drop voltage Vf of fifth body diode D5 occurs. Accordingly, the state is switched from state (8) to state (9) in order to reduce the energy loss.

State (8) is provided for smooth and safe transition from the discharge state to the clamp state. For example, when the turning-on of fifth switching element Q5 and sixth switching element Q6 and the turning-off of third switching element Q3, fourth switching element Q4, seventh switching element Q7, and eighth switching element Q8 are simultaneously executed, an external short circuit may occur in lower cell Cb or breakdown in withstand voltage may occur in fourth switching element Q4 or seventh switching element Q7 due to a shift in switching timing. On the other hand, in state (8), since sixth body diode D6 is electrically connected, it is possible to prevent the external short circuit of the cell or the breakdown in withstand voltage of the switching element.

As shown in FIG. 9(a), in state (10), controller 13 turns off fifth switching element Q5 and sixth switching element Q6. In state (10), a charge current flows through a path formed by inductor L1->seventh switching element Q7->eighth body diode D8->second switching element Q2->first body diode D1->upper cell Ca->inductor L1.

As shown in FIG. 9(b), in state (1), controller 13 turns on second switching element Q2 and seventh switching element Q7, and turns on fifth switching element Q5 in preparation for a next clamp period. In state (1), a charge current flows through a path formed by inductor L1->seventh switching element Q7->eighth switching element Q8->second switching element Q2->first switching element Q1->upper cell Ca->inductor L1. Comparing the path shown in FIG. 9(a) with the path shown in FIG. 9(b), since the current passes through first body diode D1 and eighth body diode D8 in the former, a loss of 2 Vf in total corresponding to forward drop voltage Vf of first body diode D1 and a loss corresponding to forward drop voltage Vf of eighth body diode D8 occur. Accordingly, state (10) is switched to state (1) in order to reduce the energy loss.

State (10) is provided for smooth and safe transition from the clamp state to the charged state. For example, when the turning-off of fifth switching element Q5 and sixth switching element Q6 and the turning-on of first switching element Q1, second switching element Q2, seventh switching element Q7, and eighth switching element Q8 are simultaneously executed, an external short circuit may occur in upper cell Ca or breakdown in withstand voltage may occur in first switching element Q1 or eighth switching element Q8 due to a shift in switching timing. On the other hand, in state (10), since first body diode D1 and eighth body diode D8 are electrically connected, it is possible to prevent the external short circuit of the cell or the breakdown in withstand voltage of the switching element.

In state (1), when the energy released from inductor L1 to upper cell Ca disappears, the direction of the current is inverted, and the discharge current starts to flow from upper cell Ca to inductor L1.

In the cycle described above, the current of inductor L1 changes with a positive slope in a period of state (10)->state (1)->state (2). In a period from state (3) to state (4), a circulating current flows to inductor L1. In state (3), the energy stored in inductor L1 decreases by a loss corresponding to forward drop voltage Vf of the body diode. In state (3), the energy stored in inductor L1 is maintained.

In a period of state (5)->state (6)->state (7), the current of inductor L1 changes with a negative slope. In a period from state (8) to state (9), a circulating current flows to inductor L1. In state (8), the energy stored in inductor L1 decreases by a loss corresponding to forward drop voltage Vf of the body diode. In state (9), the energy stored in inductor L1 is maintained.

As shown in FIG. 11, end-to-end voltage VL of inductor L1 in each state is as follows. Vb is a cell voltage, and is 4 V in an example shown in FIG. 11. Vf is a forward drop voltage of the body diode, and is 0.75 V in the example shown in FIG. 11.

State (10): VL=Vb+2 Vf
States (1) and (2): VL=Vb
State (3): VL=−Vf
State (4): VL=0
State (5): VL=−Vb−2 Vf
States (6) and (7): VL=−Vb
State (8): VL=+Vf
State (9): VL=0

As shown in FIG. 11, current change ΔIL of inductor L1 in each state is as follows. L is an inductance, and (tn−t(n−1)) is a time to stay in an n-th state.
State (10): ΔIL=(2 Vb+2 Vf)*(t10−t9)/L
State (1): ΔIL=2 Vb*(t1−t10)/L State (2): $\Delta IL=2\ Vb*(t2-t1)/L$
State (3): $\Delta IL=-Vf*(t3-t2)/L$
State (4): $\Delta IL=0*(t4-t3)/L$
State (5): $\Delta IL=(-2\ Vb-2\ Vf)*(t5-t4)/L$
State (6): $\Delta IL=-2\ Vb*(t6-t5)/L$
State (7): $\Delta IL=-2\ Vb*(t7-t6)/L$
State (8): $\Delta IL=Vf*(t8-t7)/L$
State (9): $\Delta IL=0*(t9-t8)/L$ In FIG. 11, the states are drawn at equal intervals for the sake of convenience, but times of the states can be arbitrarily set. For example, the clamp periods (states (3), (4), (8), and (9)) may be set shorter than the other periods (states (1), (2), (5), (6), (7), and (10)). The period in which the current flows through the body diode may be set shorter than the period in which the current does not flow through the body diode. For example, the period of state (3) may be set shorter than the period of state (4). In this case, the loss caused by the current passing through the body diode can be further reduced. A positive energy transfer amount of the cell to be discharged and a negative energy transfer amount of the cell to be charged are indicated in a region on a positive side with 0 A of current IL of inductor L1 as a boundary, and a negative energy transfer amount of the cell to be discharged and a positive energy transfer amount of the cell to be charged are indicated in a region on a negative side with 0 A of current IL of inductor L1 as a boundary. Thus, the equalizing process of the cell to be discharged and the cell to be charged is executed by appropriately setting the times in the states.

As shown in FIG. 11, when the state is switched from state (10) to state (1), that is, when end-to-end voltage VL of inductor L1 changes from Vb+2 Vf to Vb, an unintended spike voltage is generated. Although end-to-end voltage VL of inductor L1 shown in FIG. 11 is obtained by rewriting an actual waveform obtained by an experiment into a schematic waveform, it is confirmed by an experiment that a spike occurs when the state is switched from state (10) to state (1).

This spike voltage may lead to breakdown of the switching element. The MOSFET used for the switching element is an element of which the turning-on or -off is controlled by a gate voltage, and when drain-source voltage Vds changes steeply (when dV/dt increases), a current flows through a junction capacity between the drain and the gate. This current may turn on a parasitic NPN transistor between the drain and the source of the MOSFET, the breakdown of the element of the MOSFET may be caused.

Noise generated by the spike voltage may invert high or low of the drive signal supplied from controller 13 to the gates of switching elements Q1 to Q8 and may cause equalizing circuit 10 to malfunction. Hereinafter, a method for suppressing the spike voltage will be described.

Figure 9:
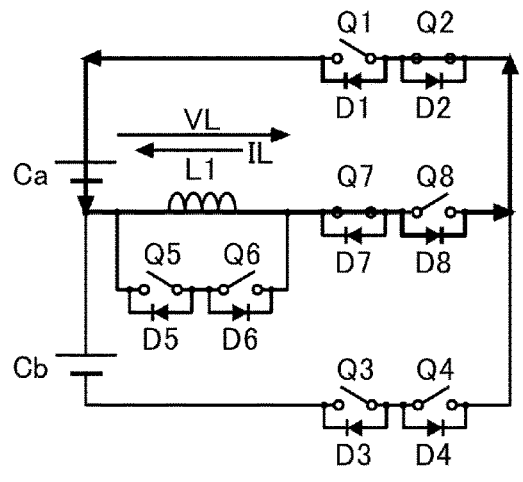
FIG. 9($a$) to ($e$) is diagram showing a circuit state in control according to a comparative example of the power storage system shown in FIG. 8($a$) (part 1).
Figure 9:
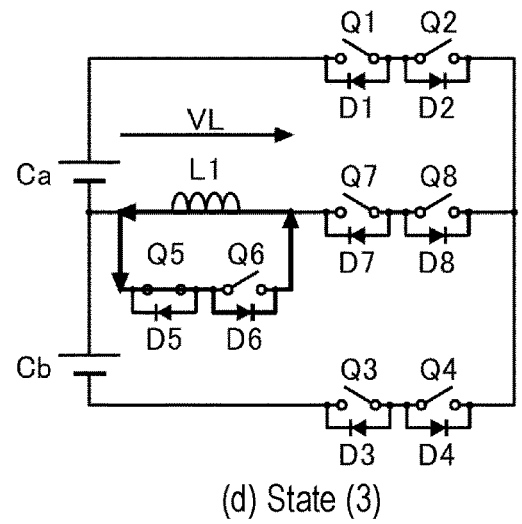
Figure 9:
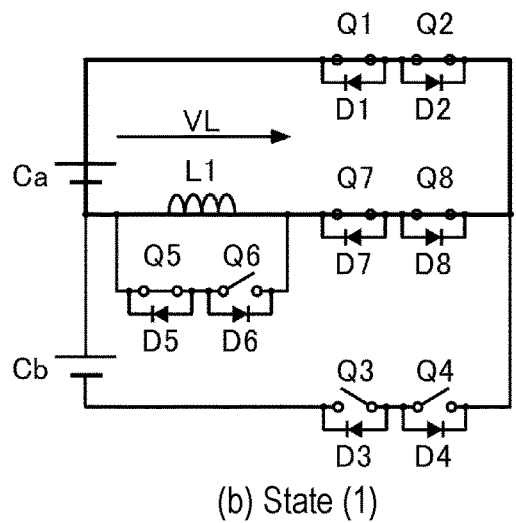
Figure 9:
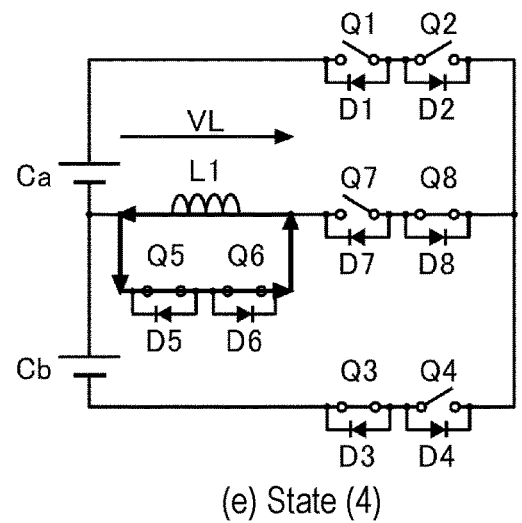
Figure 9:
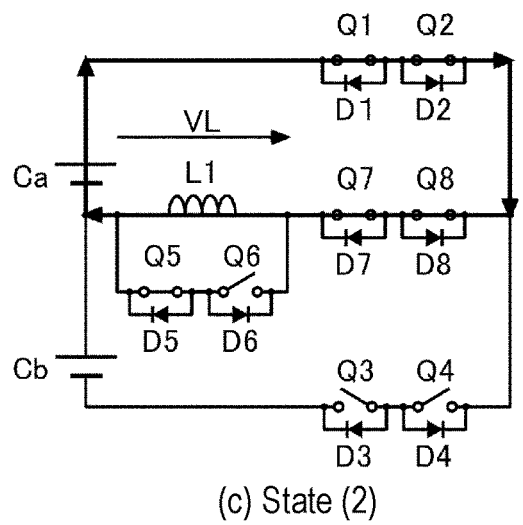
Figure 12:
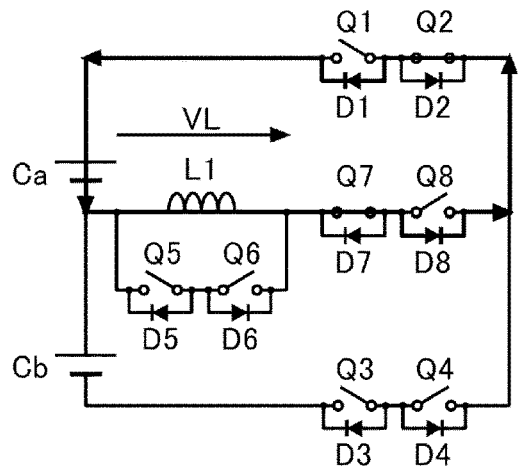
FIG. 12($a$) to ($c$) is diagram showing a circuit state in control according to the exemplary embodiment of the power storage system shown in FIG. 8.
Figure 12:
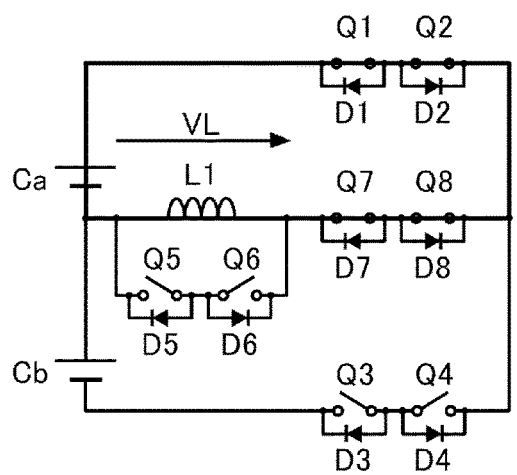
Figure 12:
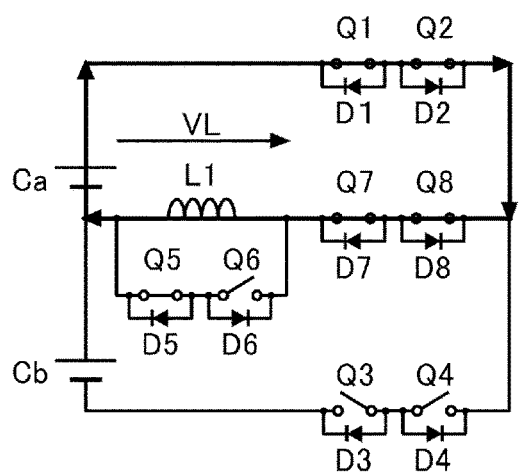
Figure 13:
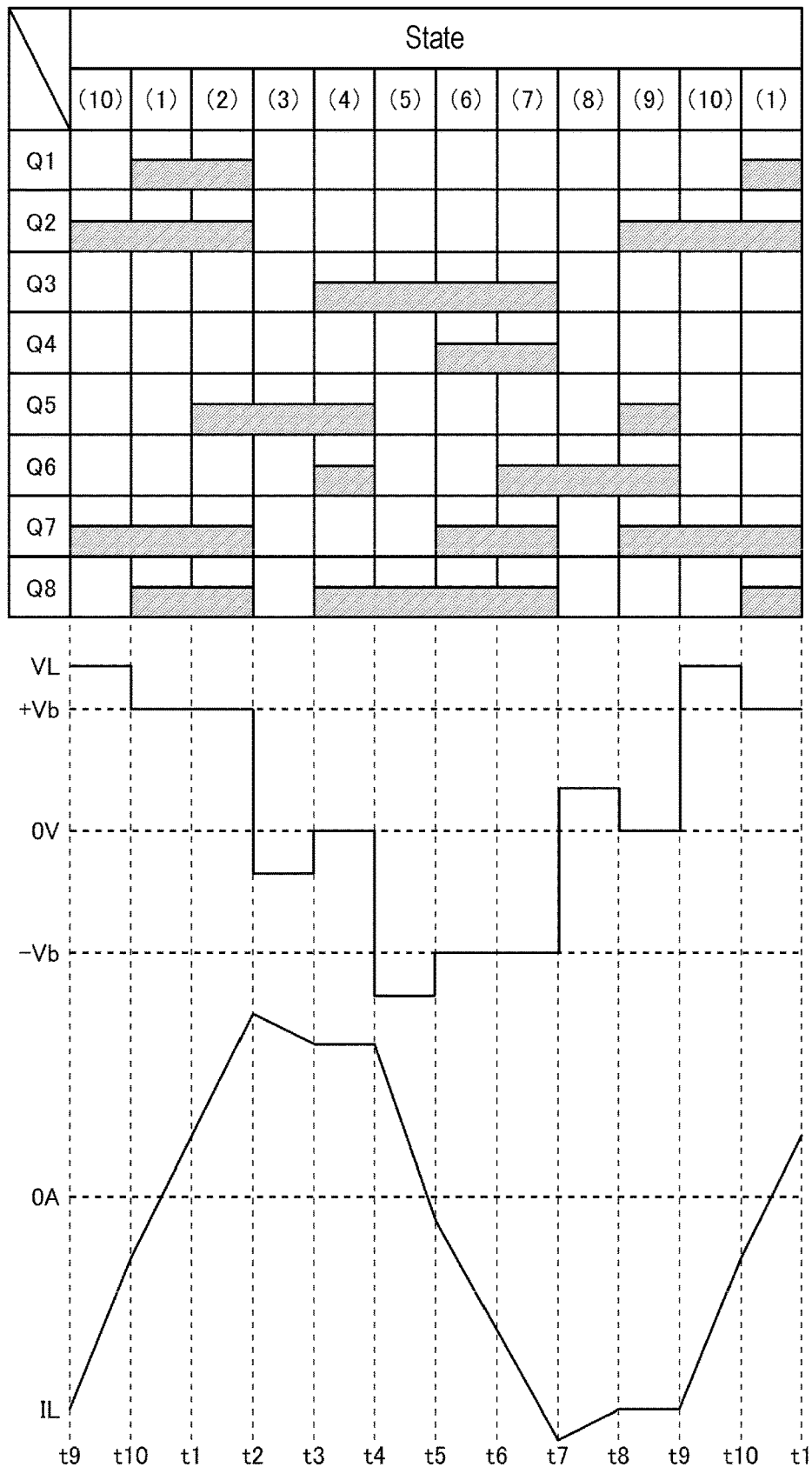
FIG. 13 is a diagram showing a switching pattern of eight switching elements, a time transition of an end-to-end voltage of an inductor, and a current of the inductor in the control according to the exemplary embodiment of the power storage system shown in FIG. 8($a$).

FIG. 12(a) to (c) is diagram showing a circuit state in the control according to the exemplary embodiment of power storage system 1 shown in FIG. 8(a) in correspondence with current IL of inductor L1. FIG. 13 is a diagram showing a switching pattern of eight switching elements Q1 to Q8 in which FIG. 9(a) to (c) is replaced with FIG. 12(a) to (c) in a switching order of ten steps shown in FIGS. 9 and 10, a time transition of end-to-end voltage VL of inductor L1, and current IL of inductor L1 in the control according to the exemplary embodiment of power storage system 1 shown in FIG. 8(a). A difference between FIG. 9(a) to (c) and FIG. 12(a) to (c) is only a difference in the state of fifth switching element Q5 in FIGS. 9(b) and 12(b).

As shown in FIG. 12(b), in state (1) according to the exemplary embodiment, controller 13 controls first switching element Q1, second switching element Q2, seventh switching element Q7, and eighth switching element Q8 to an on state, and controls third switching element Q3, fourth switching element Q4, fifth switching element Q5, and sixth switching element Q6 to an off state.

As shown in FIG. 12(c), in state (2) according to the exemplary embodiment, controller 13 turns on fifth switching element Q5 in preparation for a next clamp period. Other states (3) to (10) according to the exemplary embodiment are similar to states (3) to (10) according to the comparative example shown in FIGS. 9(d) to (e), 10(a) to (e), and 9(a).

As described above, in the present exemplary embodiment, a timing at which fifth switching element Q5 is turned on is delayed as preparation for a next clamp period. As shown in FIG. 13, in the present exemplary embodiment, when the state is switched from state (10) to state (1), the spike voltage is not generated. Although end-to-end voltage VL of inductor L1 shown in FIG. 13 is obtained by rewriting an actual waveform obtained by an experiment into a schematic waveform, it is confirmed by an experiment that the spike shown in FIG. 11 does not occur when the state is switched from state (10) to state (1).

As described above, according to the present exemplary embodiment, the timing at which fifth switching element Q5 constituting one of the bidirectional switch used as the clamp switch is turned on is delayed as the preparation for the next clamp period, and thus, the occurrence of the unintended spike can be suppressed. Accordingly, it is possible to achieve highly reliable and safe equalizing circuit 10.

The present disclosure has been described above based on the exemplary embodiment. The exemplary embodiment is exemplified, and it is easily understood by the person of ordinary skill in the art that various modified examples are available for combinations of each of configuration elements of the examples and each of processing process thereof, and that such modifications are also within the scope of the present disclosure.

In FIGS. 6(a) and (b), the energy transfer between first cell C1 and second cell C2 and the energy transfer between first cell C1 and fourth cell C4 have been described. In this regard, the above exemplary embodiment is applicable to the overall energy transfer between any two cells. FIGS. 6(a) and (b) corresponds to the configurations of the first wiring switch and the second wiring switch of cell selection circuit 11 of power storage system 1 shown in FIG. 1, and first clamp switch Sc1 to fourth clamp switch Sc4 of energy retaining circuit 12, and each switch of the first wiring switch, the second wiring switch, and first clamp switch Sc1 to fourth clamp switch Sc4 includes two switching elements. The paths (discharge path and charge path) through which energy is transferred between the selected cell and inductor L1 are formed by a total of four switches including one predetermined first wiring switch, one predetermined second wiring switch, and two predetermined clamp switches among first clamp switch Sc1 to fourth clamp switch Sc4, that is, eight switching elements, in both the discharge path and the charge path. The clamp path for retaining the energy stored in inductor L1 is formed by two predetermined clamp switches of first clamp switch Sc1 to fourth clamp switch Sc4, that is, four switching elements.

In the period in which the discharge path is formed, a total of eight switching elements including two pairs of four switching elements present at positions where four clamp switches cross each other and one pair of two switching elements constituting the first wiring switch and the second wiring switch among the eight switching elements are controlled to the on state. Similarly to the period in which the charge path is formed, in the period in which the charge path is formed, a total of eight switching elements including two pairs of four switching elements constituting the clamp switch and one pair of two switching elements constituting the first wiring switch and the second wiring switch among the eight switching elements are controlled to an on state. In the period in which the clamp path is formed, two pairs of four switching elements among eight switching elements in the four clamp switches are controlled to an on state.

After the discharge state is ended, controller 13 switches the states in the order of a first clamp state (in the above exemplary embodiment, states (3) and (8)) where the clamp current flows through the body diode of the switching element by turning off at least one switching element among the four switching elements forming the clamp path and a second clamp state (in the above exemplary embodiment, states (4) and (9)) where the switching element in the off state is turned on and all the four switching elements are turned on.

In the first clamp state, two switching elements having body diodes in the same direction among the four switching elements forming the clamp path may be turned off. In this case, the loss increases, but safety is further improved.

After the second clamp state is ended, controller 13 switches the states in the order of a first charge state (in the above exemplary embodiment, states (5) and (10)) where the charge current flows through the body diode of the switching element by turning off at least one switching element among the eight switching elements forming the charge path and a second charge state (in the above exemplary embodiment, states (6) and (1)) where the switching element in the off state is turned on and all the eight switching elements are turned on.

In the above exemplary embodiment, in the first charge state, two switching elements of one switching element constituting the first wiring switch or the second wiring switch and one switching element constituting the clamp switch are turned off, but only one of the switching elements may be turned off. In this case, the safety against the breakdown in withstand voltage of the switching element is reduced, but the loss is reduced.

After the second clamp state is ended, controller 13 turns off two or four switching elements among the four switching elements forming the clamp path. In the above exemplary embodiment, the pair of two switching elements (fifth switching element Q5 and sixth switching element Q6) is turned off, but all the four switching elements forming the clamp path may be turned off.

Thereafter, at a timing delayed from a timing at which the state is switched from the first charge state to the second charge state and before the state is switched to the next first clamp state, controller 13 forms the clamp path in the first clamp state by turning on half of the turned-off two or four switching elements.

In the above exemplary embodiment, the timing at which the state is switched from state (1) to state (2) is adopted as the timing delayed from the timing at which the state is switched from the first charge state to the second charge state (state (10)) and a timing before the state is switched to the next first clamp state (state (3)). In this regard, a timing in the middle of state (1) may be adopted, or a timing in the middle of state (2) may be adopted.

In the above-described exemplary embodiment, an exemplary embodiment in which the MOSFET is used as the switching element has been described. In this regard, a semiconductor switching element such as an insulated gate bipolar transistor (IGBT) in which a parasitic diode is not formed may be used. In this case, an external diode is connected in parallel to the semiconductor switching element instead of the parasitic diode. As the diode with lower forward drop voltage Vf is used, the loss can be reduced, and the efficiency is improved.

Further, in the above-described exemplary embodiment, an example of equalizing a plurality of cells connected in series by an active method has been described. In this regard, the equalizing circuit according to the exemplary embodiment can be used to equalize a plurality of modules connected in series. The "cell" in the present specification may be appropriately read as a "module".

Figure 14:
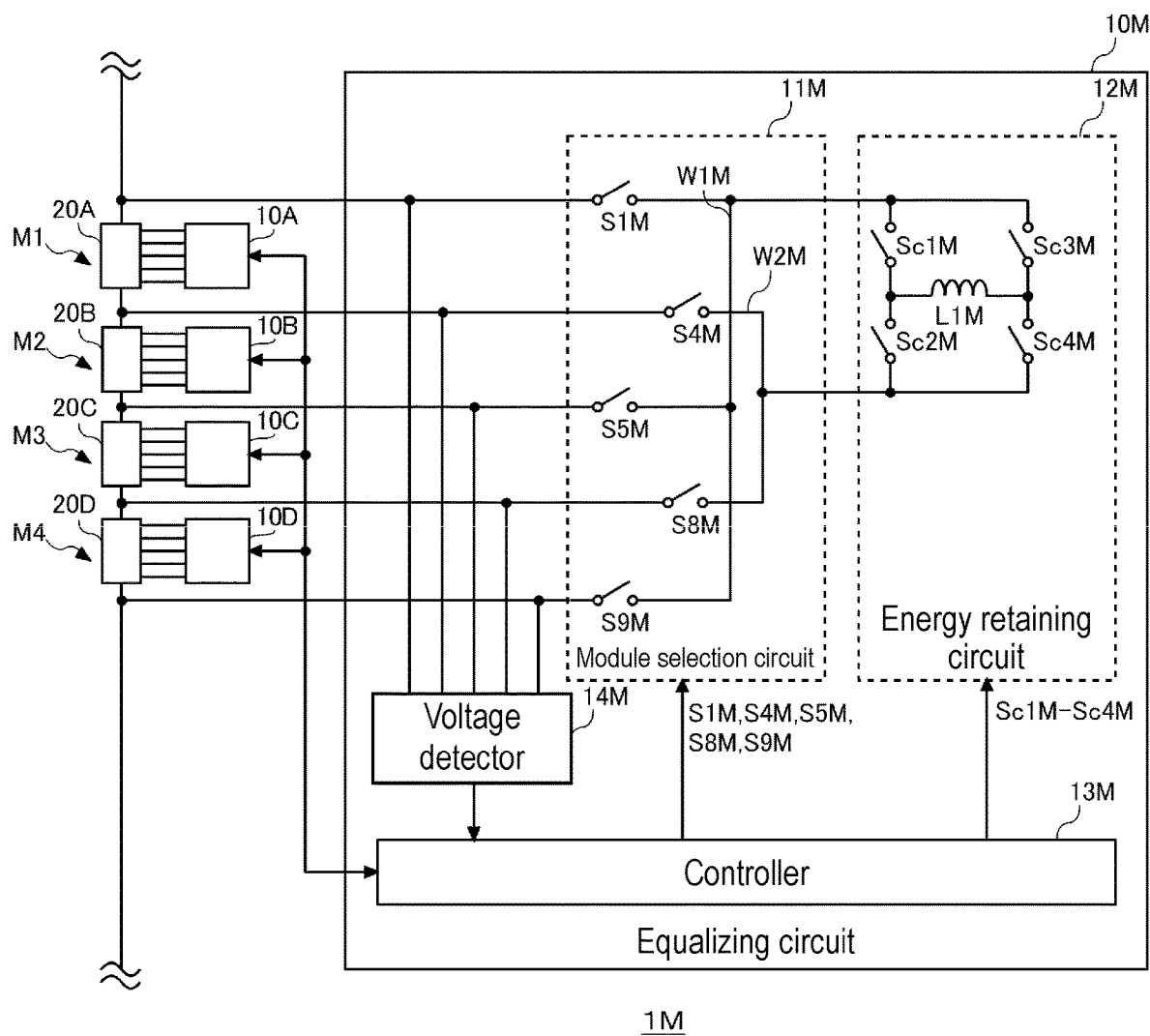
FIG. 14 is a diagram showing a configuration of a power storage system according to another exemplary embodiment.

FIG. 14 is a diagram showing a configuration of a power storage system according to another exemplary embodiment. FIG. 14 shows an exemplary embodiment of a power storage system including an equalizing circuit that executes an equalizing process among a plurality of modules connected in series. In FIG. 14, each of the plurality of modules includes a cell equalizing circuit and a power storage in which a plurality of cells are connected in series, as in power storage system 1 shown in FIG. 1. First module M1 includes cell equalizing circuit 10A and power storage 20A, second module M2 includes cell equalizing circuit 10B and power storage 20B, third module M3 includes cell equalizing circuit 10C and power storage 20C, and fourth module M4 includes cell equalizing circuit 10D and power storage 20D.

Module equalizing circuit 10M includes voltage detector 14M, module selection circuit 11M, energy retaining circuit 12M, and controller 13M.

In the present exemplary embodiment, controller 13M executes an equalizing process among m modules connected in series by an active module balance method. In the active module balance method according to the present exemplary embodiment, energy is transferred from one module (module to be discharged) to another module (module to be charged) among m modules connected in series, thereby equalizing the capacities between one module and the other module. Repeating this energy transfer equalizes the capacities among the m modules connected in series.

In addition to the above equalizing process among the plurality of modules, the equalizing process among the plurality of cells connected in series in each module is performed. The equalizing process among the plurality of cells connected in series in each module may be executed in a multiplexed manner with the equalizing process among the plurality of modules. In this case, module equalizing circuit 10M and cell equalizing circuits 10A to 10D are operated in cooperation with each other by communication. The equalizing process among the modules is preferably executed with priority over the equalizing process among the cells, and after the equalizing process among the modules is completed, the equalizing process among the cells is completed, and thereby it is possible to eliminate the voltage difference between the cells generated by executing the equalizing process among the modules.

Figure 15:
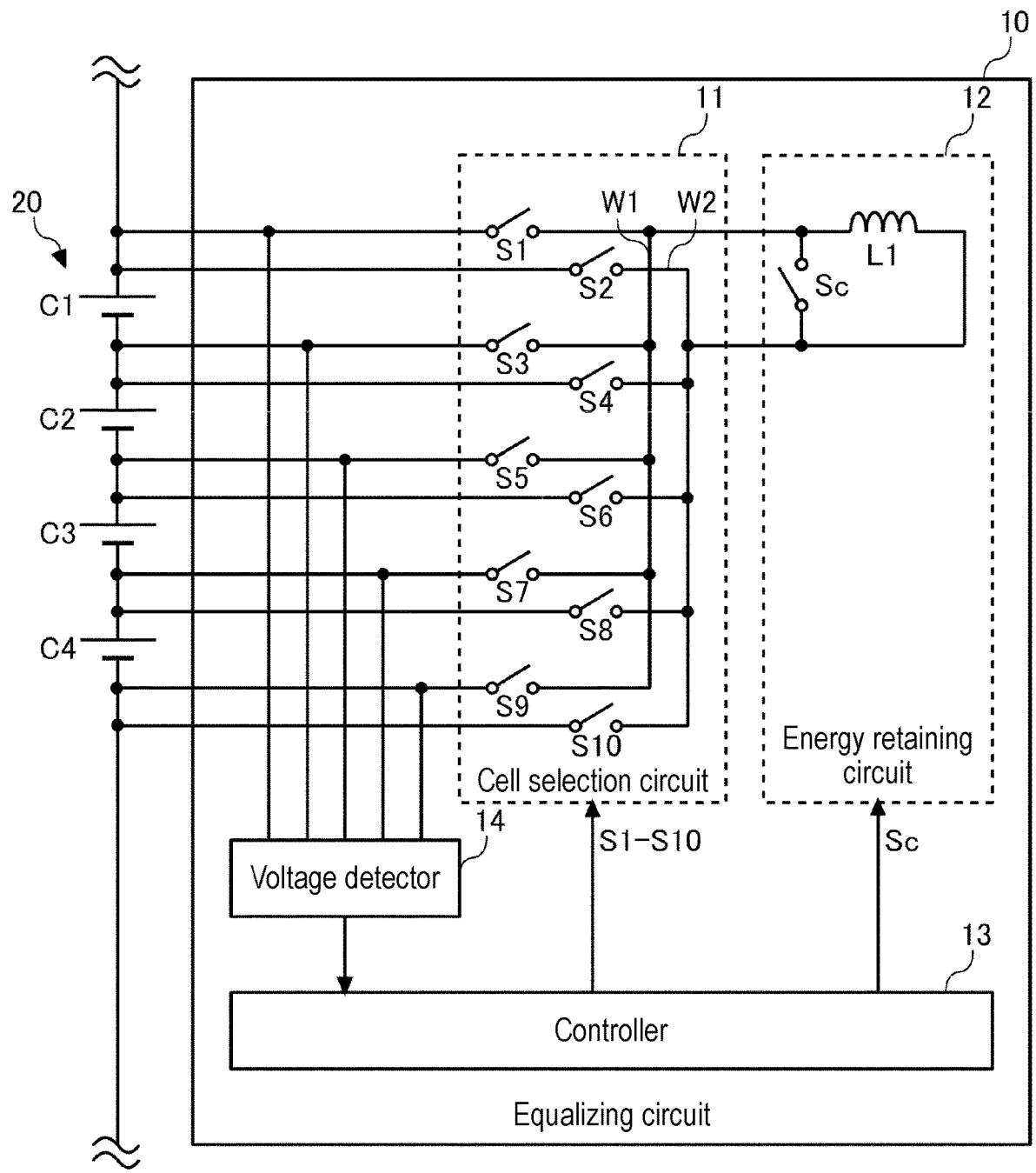
FIG. 15 is a diagram showing a configuration of a power storage system according to still another exemplary embodiment.

FIG. 15 is a diagram showing a configuration of a power storage system according to still another exemplary embodiment. In the exemplary embodiment shown in FIG. 15, cell selection circuit 11 includes first wiring W1 connected to a first end of inductor L1, second wiring W2 connected to a second end of inductor L1, (n+1) first wiring switches, and (n+1) second wiring switches. The (n+1) first wiring switches are connected between nodes of the n cells connected in series and first wiring W1, respectively. The (n+1) second wiring switches are connected between nodes of the n cells connected in series and second wiring W2, respectively.

Energy retaining circuit 12 (also referred to as a damper circuit) includes inductor L1 and clamp switch Sc. Clamp switch Sc is a switch for electrically connecting both ends of inductor L1 in energy retaining circuit 12. Energy retaining circuit 12 can form a closed loop including inductor L1 in a state where cell selection circuit 11 does not select any cell. That is, when clamp switch Sc is controlled to an on state, a closed loop including inductor L1 and clamp switch Sc, that is, a clamp path is formed. In the exemplary embodiment shown in FIG. 15, paths (discharge path and charge path) through which energy is transferred between the selected cell and inductor L1 are formed by one predetermined first wiring switch and one predetermined second wiring switch. However, since energy retaining circuit 12 does not have a function of switching a direction of a current flowing through inductor L1, the discharge path and the charge path are formed by selecting the first wiring switch and the second wiring switch for switching the state to the electrical connection state according to the direction of the current flowing through inductor L1.

Controller 13 forms the clamp path in the first clamp state by turning on all the plurality of switching elements forming the discharge path after the second clamp state is ended and then turning on one of the two switching elements forming clamp switch Sc before the state is switched to the next first clamp state.

In the above-described exemplary embodiment, the equalizing circuit of the active cell balance method has been described, but it can also be applied to energy transfer not intended for equalization among the plurality of cells or modules. For example, when temperatures of two modules are significantly different, at least a portion of the energy of a module having a high temperature may be transferred to a module having a low temperature in order to reduce storage degradation.

In the above-described exemplary embodiment, the energy transfer from one cell to another cell has been described, but energy transfer from a plurality of cells connected in series to a plurality of cells connected in series can also be performed. Energy transfer from one cell to a plurality of cells connected in series and energy from a plurality of cells connected in series to another cell can also be performed. The same applies to the modules.

The exemplary embodiment may be specified by the following items.

[Item 1]

Energy transfer circuit (10) including
inductor (L1),
cell selection circuit (11) that is provided between n cells (C1 to C4) connected in series, where n is an integer of 2 or more, and inductor (L1), and is capable of electrically connecting both ends of a selected cell including any one of n cells (C1 to C4) or a plurality of cells connected in series and both ends of inductor (L1),
clamp circuit (12) that includes clamp switches (Sc1 to Sc4 or Sc) for forming a closed loop including inductor (L1) in a state where cell selection circuit (11) does not select any cell (any one of C1 to C4), and
controller (13) that controls cell selection circuit (11) and clamp circuit (12),
in which cell selection circuit (11) includes
first wiring (W1) that is connected to one end of inductor (L1),
second wiring (W2) that is connected to an other end of inductor (L1),
a plurality of first wiring switches (S1, S5, and S9 or S1, S3, S5, S7, and S9) that selectively connect one of both the ends of the selected cell to first wiring (W1), and
at least one second wiring switch (S4 or S8, or S2, S4, S6, S8, or S10) that selectively connects another end of both the ends of the selected cell to second wiring (W2),
in clamp switch (Sc2 or Sc), two switching elements, having diodes, are connected in series and formed in a state where the diodes are in opposite directions, the diodes each being connected or formed in parallel with corresponding one of the two switching elements,
in first wiring switch (S1), two switching elements having, diodes, are connected in series and formed in a state where the diodes are in opposite directions, the diodes each being connected or formed in parallel with corresponding one of the two switching elements, and
in second wiring switch (S4), two switching elements having diodes, are connected in series and formed in a state where the diodes are in opposite directions, the diodes each being connected or formed in parallel with corresponding one of the two switching elements,
controller (13) controls states in order of an inductor current increase state where a discharge path through which both the ends of inductor (L1) are connected to nodes on both sides of discharge cell (C1) which is the selected cell to be discharged among n cells (C1 to C4) is formed by controlling electrical connection states of first wiring switch (S1), second wiring switch (S4), and clamp switch (Sc1 to Sc4 or Sc) connected to the nodes on both the sides of discharge cell (C1), a current flowing to inductor (L1) from discharge cell (C1), and the current flowing to inductor (L1) is increased, a clamp state where a clamp path through which both the ends of inductor (L1) are connected via clamp switch (Sc1 or Sc4) is formed by controlling the electrical connection states of first wiring switch (S1), second wiring switch (S4), and clamp switch (Sc1 to Sc4 or Sc) connected to the nodes of both the sides of discharge cell (C1), a clamp current flowing between both the ends of inductor (L1), and the current flowing to inductor (L1) is circulated through the clamp path, and an inductor current decrease state where a charge path through which both the ends of inductor (L1) are connected to nodes of both sides of charge cell (C2) which is the selected cell to be charged among n cells (C1 to C4) is formed by controlling electrical connection states of first wiring switch (S5), second wiring switch (S4), and clamp switch (Sc1 to Sc4 or Sc) connected to the nodes of both the sides of charge cell (C2), a current flowing to charge cell (C2) from inductor (L1), and the current flowing to inductor (L1) is decreased,
the clamp state includes a first clamp state where a clamp current flows through a diode in parallel with at least one switching element among a plurality of switching elements forming the clamp path by turning off the at least one switching element and a second clamp state where the switching element in the off state is turned on and all the plurality of switching elements are turned on, and
controller (13) forms the clamp path in the first clamp state by turning on all of a plurality of switching elements forming the discharge path in the inductor current increase state and then turning on a part of a plurality of switching elements constituting the clamp switch before the state is switched to a next first clamp state.

Accordingly, it is possible to achieve highly reliable and safe energy transfer circuit (10).

[Item 2]

Energy transfer circuit (10) according to item 1, in which
cell selection circuit (11) includes
a plurality of first wiring switches (S1, S5, and S9) that are connected between odd-numbered nodes among nodes (n+1) of n cells (C1 to C4) connected in series and first wiring (W1), and
at least one second wiring switch (S4 or S8) that is connected between even-numbered nodes among the nodes (n+1) of n cells (C1 to C4) connected in series and second wiring (W2),
clamp circuit (12) includes first clamp switch (Sc1) and second clamp switch (Sc2) connected to each other in series and third clamp switch (Sc3) and fourth clamp switch (Sc4) connected to each other in series,
inductor (L1) is connected between a node between first clamp switch (Sc1) and second clamp switch (Sc2) and a node between third clamp switch (Sc3) and fourth clamp switch (Sc4),
ends of first clamp switch (Sc1) and third clamp switch (Sc3) that are not connected to inductor (L1) are connected to first wiring (W1),
ends of second clamp switch (Sc2) and fourth clamp switch (Sc4) that are not connected to inductor (L1) are connected to second wiring (W2), and
clamp circuit (12) is connected as a full bridge circuit by inductor (L1), first clamp switch (Sc1), second clamp switch (Sc2), third clamp switch (Sc3), and fourth clamp switch (Sc4).

Accordingly, it is possible to achieve highly reliable and safe energy transfer circuit (10) having clamp circuit (12) constituted as a full bridge circuit.

[Item 3]

Energy transfer circuit (10) according to item 1, in which
cell selection circuit (11) includes
(n+1) first wiring switches (S1, S3, S5, S7, and S9) that are connected between nodes of n cells (C1 to C4) connected in series and first wiring (W1), and
(n+1) second wiring switches (S2, S4, S6, S8, and S10) that are connected between the nodes of n cells (C1 to C4) connected in series and second wiring (W2).

Accordingly, it is possible to constitute one clamp switch (Sc) used for clamp circuit (12). That is, one clamp switch can be constituted by two switching elements.

[Item 4]

Energy transfer circuit (10) according to item 2, in which
after the second clamp state is ended, controller (13) switches between states in order of a first charge state where a charge current flows through body diodes (D1 and D8) in parallel with two switching elements (Q1 and Q8) by turning off two switching elements (Q1 and Q8), the two switching elements being one switching element (Q1) constituting first wiring switch (S1) or the second wiring switch and one switching element (Q8) constituting clamp switch (Sc1) among eight switching elements (Q1, Q2, Q7, Q8, S4, and Sc4) forming the charge path, and a second charge state where two switching elements (Q1 and Q8) in the off state are turned on and all eight switching elements (Q1, Q2, Q7, Q8, S4, and Sc4) are turned on.

Accordingly, it is possible to safely switch from the clamp state to the charge state.

[Item 5]

Energy transfer circuit (10) according to item 4, in which
controller (13) switches between states in order of a first clamp state where a clamp current flows through diode (D6) in parallel with one switching element (Q6) among four switching elements (Q5, Q6, and Sc4) forming the clamp path by turning off one switching element (Q6), and a second clamp state where switching element (Q6) in the off state is turned on and all four switching elements (Q5, Q6, and Sc4) are turned on after the inductor current increase state is ended, and
forms the clamp path in the first clamp state by turning off two switching elements (Q5 and Q6) of one switching element (Q6) in the off state and one switching element (Q5) connected to switching element (Q6) in series in an opposite direction among four switching elements (Q5, Q6, and Sc4) forming the clamp path after the second clamp state is ended and turning on one (Q5) of two switching elements (Q5 and Q6) turned off at a timing delayed from a timing at which the state is switched from the first charge state to the second charge state and before the state is switched to a next first clamp state.

Accordingly, it is possible to suppress the occurrence of the spike when the clamp path in the first clamp state is prepared.

[Item 6]

Energy transfer circuit (10) according to any one of items 1 to 5 further including
voltage detector (14) that detects voltages of n cells (C1 to C4),
in which controller (13) executes an equalizing process among n cells (C1 to C4) based on the voltages of n cells (C1 to C4) detected by voltage detector (14).

Accordingly, it is possible to achieve the equalizing circuit using the energy transfer.

[Item 7]

Energy transfer circuit (10) according to item 6, in which
controller (13) determines a target voltage or a target capacity of n cells (C1 to C4) based on the voltages of n cells (C1 to C4) detected by voltage detector (14), determines that a cell with a voltage or a capacity higher than the target voltage or the target capacity is a cell to be discharged, and determines that a cell with a voltage or a capacity lower than the target voltage or the target capacity is a cell to be charged.

Accordingly, active cell balance can be achieved by the energy transfer between cells (C1 to C4).

[Item 8]

Power storage system (1) including
n cells (C1 to C4) connected in series, where n is an integer of 2 or more; and
energy transfer circuit (10) according to any one of items 1 to 7.

Accordingly, it is possible to construct power storage system (1) that achieves highly reliable and safe energy transfer circuit (10).

[Item 9]

Energy transfer circuit (10M) including:
inductor (L1M);
module selection circuit (11M) that is provided between m modules (M1 to M4) connected in series, where m is an integer of 2 or more, and inductor (L1M), and is capable of electrically connecting both ends of a selection module including any one of m modules (M1 to M4) or a plurality of modules connected in series and both ends of inductor (L1M);

clamp circuit (12M) that includes clamp switches (Sc1M to Sc4M) for forming a closed loop including inductor (L1M) in a state where module selection circuit (11M) does not select any module (M1 to M4); and controller (13M) that controls module selection circuit (11M) and clamp circuit (12M), in which module selection circuit (11M) includes first wiring (W1M) that is connected to one end of inductor (L1M), second wiring (W2M) that is connected to another end of inductor (L1M), a plurality of first wiring switches (S1M, S5M, and S9M) that selectively connect one of both the ends of the selection module to first wiring (W1M), and at least one second wiring switch (S4M or S8M) that selectively connects an other end of both the ends of the selection module to second wiring (W2M), in clamp switch (Sc2M), two switching elements (Q5 and Q6), having diodes (D5 and D6), are connected in series in a state where diodes (D5 and D6) are in opposite directions, the diodes each being connected or formed in parallel with corresponding one of the two switching elements, in first wiring switch (S1M), two switching elements (Q1 and Q2), having diodes (D1 and D2), are connected in series and formed in a state where diodes (D1 and D2) are in opposite directions, the diodes each being connected or formed in parallel with corresponding one of the two switching elements, in second wiring switch (S4), two switching elements, having diodes, are connected in series and formed in a state where the diodes are in opposite directions, the diodes each being connected or formed in parallel with corresponding one of the two switching elements, controller (13M) controls states in order of an inductor current increase state where a discharge path through which both the ends of inductor (L1M) are connected to nodes on both sides of discharge module (M1) which is the selection module to be discharged among m modules (M1 to M4) is formed by controlling electrical connection states of first wiring switch (S1M), second wiring switch (S4M), and clamp switch (Sc1 to Sc4) connected to the nodes on both the sides of discharge module (M1), a current flowing to inductor (L1M) from discharge module (M1), and the current flowing to inductor (L1M) is increased, a clamp state where a clamp path through which both the ends of inductor (L1M) are connected via clamp switch (Sc1M or Sc4M) is formed by controlling the electrical connection states of first wiring switch (S1M), second wiring switch (S4M), and clamp switch (Sc1M to Sc4M) connected to the nodes of both the sides of discharge module (M1), a clamp current flowing between both the ends of inductor (L1M), and the current flowing to inductor (L1M) is circulated through the clamp path, and an inductor current decrease state where a charge path through which both the ends of inductor (L1M) are connected to nodes of both sides of charge module (M2) which is the selection module to be charged among m modules (M1 to M4) is formed by controlling electrical connection states of first wiring switch (S5M), second wiring switch (S4M), and clamp switch (Sc1M to Sc4M) connected to the nodes of both the sides of charge module (M2), a current flowing to charge module (M2) from inductor (L1M), and the current flowing to inductor (L1M) is decreased, the clamp state includes a first clamp state where a clamp current flows through diode (D6) in parallel with at least one switching element (Q6) among a plurality of switching elements (Q5 and Q6) forming the clamp path by turning off at least one switching element (Q6) and a second clamp state where switching element (Q6) in the off state is turned on and all the plurality of switching elements (Q5 and Q6) are turned on, and controller (13M) forms the clamp path in the first clamp state by turning on all of a plurality of switching elements (Q1, Q2, Q7, and Q8) forming the discharge path in the inductor current increase state and then turning on a part (Q5) of a plurality of switching elements (Q5 and Q6) constituting clamp switch (Sc2M) before the state is switched to a next first clamp state.

Accordingly, it is possible to achieve highly reliable and safe energy transfer circuit (10M).

[Item 10]

Energy transfer circuit (10M) according to item 9, in which module selection circuit (11M) includes a plurality of first wiring switches (S1M, S5M, and S9M) that are connected between odd-numbered nodes among nodes (n+1) of m modules (M1 to M4) connected in series and first wiring (W1M), and at least one second wiring side switch (S4M or S8M) that is connected between even-numbered nodes among the nodes (n+1) of m modules (M1 to M4) connected in series and second wiring (W2M), clamp circuit (12M) includes first clamp switch (Sc1M) and second clamp switch (Sc2M) connected to each other in series and third clamp switch (Sc3M) and fourth clamp switch (Sc4M) connected to each other in series, inductor (L1M) is connected between a node between first clamp switch (Sc1M) and second clamp switch (Sc2M) and a node between third clamp switch (Sc3M) and fourth clamp switch (Sc4M), ends of first clamp switch (Sc1M) and third clamp switch (Sc3M) that are not connected to inductor (L1M) are connected to first wiring (W1M), ends of second clamp switch (Sc2M) and fourth clamp switch (Sc4M) that are not connected to inductor (L1M) are connected to second wiring (W2M), and clamp circuit (12M) is connected as a full bridge circuit by inductor (L1M), first clamp switch (Sc1M), second clamp switch (Sc2M), third clamp switch (Sc3M), and fourth clamp switch (Sc4M).

Accordingly, it is possible to achieve highly reliable and safe energy transfer circuit (10M) having clamp circuit (12) constituted as a full bridge circuit.

[Item 11]

Energy transfer circuit (10M) according to item 9, in which module selection circuit (11M) includes (m+1) first wiring side switches (S1M, S3M, S5M, S7M, and S9M) that are connected between nodes of m modules (M1 to M4) connected in series and first wiring (W1M), and (m+1) second wiring side switches (S2M, S4M, S6M, S8M, and S10M) that are connected between the nodes of m modules (M1 to M4) connected in series and second wiring (W2M).

Accordingly, it is possible to configure one clamp switch (ScM) used for clamp circuit (12M). That is, one clamp switch can be constituted by two switching elements.

[Item 12]

Energy transfer circuit (10M) according to item 10, in which after the second clamp state is ended, controller (13M) switches between states in order of a first charge state where a charge current flows through diodes (D1 and D8) in parallel with two switching elements (Q1 and Q8) by turning off two switching elements (Q1 and Q8), the two switching elements being one switching element (Q1) constituting first wiring side switch (S1M) or the second wiring side switch and one switching element (Q8) constituting clamp switch (Sc1M) among eight switching elements (Q1, Q2, Q7, Q8, S4M, and Sc4M) forming the charge path, and a second charge state where the two switching elements (Q1 and Q8) in the off state are turned on and all eight switching elements (Q1, Q2, Q7, Q8, S4M, and Sc4M) are turned on.

Accordingly, it is possible to safely switch from the clamp state to the charge state.

[Item 13]

Energy transfer circuit (10M) according to item 12, in which controller (13M) switches between states in order of a first clamp state where a clamp current flows through diode (D6) in parallel with one switching element (Q6) among four switching elements (Q5, Q6, and Sc4M) forming the clamp path by turning off one switching element (Q6), and a second clamp state where switching element (Q6) in the off state is turned on and all four switching elements (Q5, Q6, and Sc4M) are turned on after the inductor current increase state is ended, and forms the clamp path in the first clamp state by turning off two switching elements (Q5 and Q6) of one switching element (Q6) in the off state and one switching element (Q5) connected to one switching element (Q6) in the off state in series in an opposite direction among four switching elements (Q5, Q6, and Sc4M) forming the clamp path after the second clamp state is ended and turning on one (Q5) of two switching elements (Q5 and Q6) turned off at a timing delayed from a timing at which the state is switched from the first charge state to the second charge state and before the state is switched to a next first clamp state.

Accordingly, it is possible to suppress the occurrence of the spike when the clamp path in the first clamp state is prepared.

[Item 14]

Energy transfer circuit (10M) according to any one of items 9 to 13 further including voltage detector (14M) that detects voltages of m modules (M1 to M4), in which controller (13M) executes an equalizing process among m modules (M1 to M4) based on the voltages of m modules (M1 to M4) detected by voltage detector (14M).

Accordingly, it is possible to achieve the equalizing circuit using the energy transfer.

[Item 15]

Energy transfer circuit (10M) according to item 14, in which controller (13M) determines a target voltage or a target capacity of m modules (M1 to M4) based on the voltages of m modules (M1 to M4) detected by voltage detector (14M), determines that a module with a voltage or a capacity higher than the target voltage or the target capacity is a module to be discharged, and determines that a module with a voltage or a capacity lower than the target voltage or the target capacity is a module to be charged.

Accordingly, active module balance can be achieved by energy transfer between modules (M1 to M4).

[Item 16]

Energy transfer circuit (10M) according to item 14, in which each of m modules (M1 to M4) includes a plurality of cells (C1 to C4) connected in series, cell voltage detector (14) that detects cell voltages of the plurality of cells (C1 to C4), and cell equalizing circuit (each of 10A to 10D) that equalizes a plurality of cell voltages within same module (each of M1 to M4) based on the cell voltages detected by cell voltage detector (14), in which each of cell equalizing circuit (10A to 10D) operates in cooperation with controller (13M) by communication, and executes an equalizing process among the plurality of cells (C1 to C4) after the equalizing process among m modules (M1 to M4) is executed.

Accordingly, it is possible to efficiently achieve equalization among all the cells by concurrently using active module balance by energy transfer between modules (M1 to M4) and active cell balance by energy transfer between cells (C1 to C4).

[Item 17]

Power storage system (1M) including m modules (M1 to M4) connected in series, where m is an integer of 2 or more; and energy transfer circuit (10M) according to any one of items 9 to 16.

According to this, it is possible to construct power storage system (1M) achieving highly reliable and safe energy transfer circuit (10M).

REFERENCE MARKS IN THE DRAWINGS

1: power storage system
10: equalizing circuit
11: cell selection circuit
12: energy retaining circuit
13: controller
14: voltage detector
20: power storage
C1-C4, Ca, Cb: cell
L1: inductor
W1: first wiring
W2: second wiring
S1-S10: switch
Sc1-Sc4: clamp switch
Q1-Q8: switching element
D1-D8: body diode

The invention claimed is:

1. An energy transfer circuit, comprising:
an inductor;
a cell selection circuit that is provided between n cells connected in series, where n is an integer of 2 or more, and the inductor, and is configured to electrically connect both ends of a selected cell to both ends of the inductor, the selected cell being a cell or a plurality of cells connected in series among the n cells;
a clamp circuit that includes a clamp switch for forming a closed loop including the inductor in a state where the cell selection circuit does not select any cell among the n cells; and a controller that controls the cell selection circuit and the clamp circuit, wherein the cell selection circuit includes a first wiring that is connected to one end of the inductor, a second wiring that is connected to another end of the inductor, a plurality of first wiring switches that selectively connect one of both the ends of the selected cell to the first wiring, and at least one second wiring switch that selectively connects another end of both the ends of the selected cell to the second wiring, in the clamp switch, two switching elements, including diodes, are connected in series and formed in a state where the diodes are in opposite directions, the diodes each being connected or formed in parallel with corresponding one of the two switching elements, in the first wiring switch, two switching elements, including diodes, are connected in series and formed in a state where the diodes are in opposite directions, the diodes each being connected or formed in parallel with corresponding one of the two switching elements, in the second wiring switch, two switching elements, including diodes, are connected in series and formed in a state where the diodes are in opposite directions, the diodes each being connected or formed in parallel with corresponding one of the two switching elements, the controller controls states in order of an inductor current increase state, a clamp state, an inductor current decrease state, the inductor current increase state being a state where a discharge path through which both the ends of the inductor are connected to nodes on both sides of a discharge cell that is the selected cell to be discharged among the n cells is formed by controlling electrical connection states of the first wiring switch, the second wiring switch, and the clamp switch connected to the nodes on both the sides of the discharge cell, a current flowing to the inductor from the discharge cell, and the current flowing to the inductor is increased, the clamp state being a state where a clamp path through which both the ends of the inductor are connected via the clamp switch is formed by controlling the electrical connection states of the first wiring switch, the second wiring switch, and the clamp switch connected to the nodes of both the sides of the discharge cell, a clamp current flowing between both the ends of the inductor, and the current flowing to the inductor is circulated through the clamp path, and the inductor current decrease state being a state where a charge path through which both the ends of the inductor are connected to nodes of both sides of a charge cell that is the selected cell to be charged among the n cells is formed by controlling electrical connection states of the first wiring switch, the second wiring switch, and the clamp switch connected to the nodes of both the sides of the charge cell, a current flowing to the charge cell from the inductor, and the current flowing to the inductor is decreased, the clamp state includes:

first clamp state where a clamp current flows through a diode in parallel with one or more switching elements among a plurality of switching elements forming the clamp path by turning off the one or more switching elements and a second clamp state where the one or more switching elements turned off is turned on and all the plurality of switching elements are turned on, and the controller forms the clamp path in the first clamp state by turning on all the plurality of switching elements forming the discharge path in the inductor current increase state and then turning on a part of a plurality of switching elements constituting the clamp switch, the turning on the part of the plurality of switching elements being performed before the state is switched to a next first clamp state.

2. The energy transfer circuit according to claim 1, wherein the cell selection circuit includes a plurality of first wiring switches that are connected between odd-numbered nodes among nodes of the n cells connected in series and the first wiring, where the number of nodes is n+1, and one or more second wiring switches that are connected between even-numbered nodes among the nodes of the n cells connected in series and the second wiring, the clamp circuit includes a first clamp switch and a second clamp switch connected to each other in series and a third clamp switch and a fourth clamp switch connected to each other in series, the inductor is connected between a node between the first clamp switch and the second clamp switch and a node between the third clamp switch and the fourth clamp switch, ends of the first clamp switch and the third clamp switch that are not connected to the inductor are connected to the first wiring, ends of the second clamp switch and the fourth clamp switch that are not connected to the inductor are connected to the second wiring, and the clamp circuit is connected as a full bridge circuit by the inductor, the first clamp switch, the second clamp switch, the third clamp switch, and the fourth clamp switch.

3. The energy transfer circuit according to claim 1, wherein the cell selection circuit includes first wiring switches that are connected between nodes of the n cells connected in series and the first wiring, where the number of the first wiring switches is n+1, and second wiring switches that are connected between the nodes of the n cells connected in series and the second wiring, where the number of the second wiring switches is n+1.

4. The energy transfer circuit according to claim 2, wherein after the second clamp state is ended, the controller switches between states in order of a first charge state and a second charge state, the first charge state being state where a charge current flows through diodes in parallel with two switching elements by turning off the two switching elements, the two switching elements being one switching element constituting the first wiring switch or the second wiring switch and one switching element constituting the clamp switch among eight switching elements forming the charge path, and the second charge state being state where the two switching elements turned off are turned on and all the eight switching elements are turned on.

5. The energy transfer circuit according to claim 4, wherein the controller switches between states in order of a first clamp state and a second clamp state, the first clamp state being state where a clamp current flows through a diode in parallel with one switching element among four switching elements forming the clamp path by turning off the one switching element, and the second clamp state being state where the switching element turned off is turned on and all the four switching elements are turned on after the inductor current increase state is ended, and by turning off two switching elements of the one switching element to be turned off and the one switching element connected to the switching element in series in an opposite direction among four switching elements forming the clamp path after the second clamp state is ended, and turning on one of the two switching elements turned off at a timing delayed from a timing at which the state is switched from the first charge state to the second charge state and before the state is switched to a next first clamp state to form the clamp path in the first clamp state.

6. The energy transfer circuit according to claim 1, further comprising a voltage detector that detects voltages of the n cells, wherein the controller executes an equalizing process among the n cells based on the voltages of the n cells detected by the voltage detector.

7. The energy transfer circuit according to claim 6, wherein the controller determines a target voltage or a target capacity of the n cells based on the voltages of the n cells detected by the voltage detector, determines that a cell with a voltage or a capacity higher than the target voltage or the target capacity is a cell to be discharged, and determines that a cell with a voltage or a capacity lower than the target voltage or the target capacity is a cell to be charged.

8. A power storage system, comprising:
the energy transfer circuit according to claim 1; and
the n cells connected in series, where n is an integer of 2 or more.

9. An energy transfer circuit, comprising:
an inductor;
a module selection circuit that is provided between m modules connected in series, where m is an integer of 2 or more, and the inductor, and is configured to electrically connect both ends of a selection module including any one of the m modules or a plurality of modules connected in series and both ends of the inductor;
a clamp circuit that includes clamp switch for forming a closed loop including the inductor in a state where the module selection circuit does not select any module; and
a controller that controls the module selection circuit and the clamp circuit, wherein
the module selection circuit includes
a first wiring that is connected to one end of the inductor,
a second wiring that is connected to another end of the inductor,
a plurality of first wiring switches that selectively connect one of both the ends of the selection module to the first wiring, and
one or more second wiring switches that selectively connect each an other end of both the ends of the selection module to the second wiring,
in the clamp switch, two switching elements, including diodes, are connected in series and formed in a state where the diodes are in opposite directions, the diodes each being connected or formed in parallel with corresponding one of the two switching elements, in the first wiring switch, two switching elements, including diodes, are connected in series and formed in a state where the diodes are in opposite directions, the diodes each being connected or formed in parallel with corresponding one of the two switching elements, in the second wiring switch, two switching elements, including diodes, are connected in series and formed in a state where the diodes are in opposite directions, the diodes each being connected or formed in parallel with corresponding one of the two switching elements, the controller controls states in order of an inductor current increase state, a clamp state, an inductor current decrease state, the inductor current increase state being a state where a discharge path through which both the ends of the inductor are connected to nodes on both sides of a discharge module that is the selection module to be discharged among the m modules is formed by controlling electrical connection states of the first wiring switch, the second wiring switch, and the clamp switch connected to the nodes on both the sides of the discharge module, a current flowing to the inductor from the discharge module, and the current flowing to the inductor is increased, the clamp state being a state where a clamp path through which both the ends of the inductor are connected via the clamp switch is formed by controlling the electrical connection states of the first wiring switch, the second wiring switch, and the clamp switch connected to the nodes of both the sides of the discharge module, a clamp current flowing between both the ends of the inductor, and the current flowing to the inductor is circulated through the clamp path, and the inductor current decrease state being a state where a charge path through which both the ends of the inductor are connected to nodes of both sides of a charge module that is the selection module to be charged among the m modules is formed by controlling electrical connection states of the first wiring switch, the second wiring switch, and the clamp switch connected to the nodes of both the sides of the charge module, a current flowing to the charge module from the inductor, and the current flowing to the inductor is decreased, the clamp state includes:
a first clamp state where a clamp current flows through a diode in parallel with one or more switching elements among a plurality of switching elements forming the clamp path by turning off the one or more switching elements and
a second clamp state where the one or more switching elements turned off is turned on and all the plurality of switching elements are turned on, and
the controller forms the clamp path in the first clamp state by turning on all of a plurality of switching elements forming the discharge path in the inductor current increase state and then turning on a part of a plurality of switching elements constituting the clamp switch before the state is switched to a next first clamp state.

10. The energy transfer circuit according to claim 9, wherein
the module selection circuit includes
a plurality of first wiring switches that are connected between odd-numbered nodes among nodes of the m modules connected in series and the first wiring, where the number of nodes is m+1, and one or more second wiring switches that are connected between even-numbered nodes among the nodes of the m modules connected in series and the second wiring, the clamp circuit includes a first clamp switch and a second clamp switch connected to each other in series and a third clamp switch and a fourth clamp switch connected to each other in series, the inductor is connected between a node between the first clamp switch and the second clamp switch and a node between the third clamp switch and the fourth clamp switch, ends of the first clamp switch and the third clamp switch that are not connected to the inductor are connected to the first wiring, ends of the second clamp switch and the fourth clamp switch that are not connected to the inductor are connected to the second wiring, and the clamp circuit is connected as a full bridge circuit by the inductor, the first clamp switch, the second clamp switch, the third clamp switch, and the fourth clamp switch.

11. The energy transfer circuit according to claim 9, wherein the module selection circuit includes first wiring switches that are connected between nodes of the m modules connected in series and the first wiring, where the number of the first wiring switches is m+1, and second wiring switches that are connected between the nodes of the m modules connected in series and the second wiring, where the number of the second wiring switches is m+1.

12. The energy transfer circuit according to claim 10, wherein after the second clamp state is ended, the controller switches between states in order of a first charge state and a second charge state, the first charge state being state where a charge current flows through diodes in parallel with two switching elements by turning off the two switching elements, the two switching elements being one switching element constituting the first wiring switch or the second wiring switch and one switching element constituting the clamp switch among eight switching elements forming the charge path, and the second charge state being state where the two switching elements turned off are turned on and all the eight switching elements are turned on.

13. The energy transfer circuit according to claim 12, wherein the controller switches between states in order of a first clamp state and a second clamp state, the first clamp state being state where a clamp current flows through a diode in parallel with one switching element among four switching elements forming the clamp path by turning off the one switching element, and the second clamp state being state where the switching element turned off is turned on and all the four switching elements are turned on after the inductor current increase state is ended, and by turning off two switching elements of the one switching element to be turned off and the one switching element connected to the switching element in series in an opposite direction among four switching elements forming the clamp path after the second clamp state is ended, and turning on one of the two switching elements turned off at a timing delayed from a timing at which the state is switched from the first charge state to the second charge state and before the state is switched to a next first clamp state to form the clamp path in the first clamp state.

14. The energy transfer circuit according to claim 9, further comprising a voltage detector that detects voltages of the m modules, wherein the controller executes an equalizing process among the m modules based on the voltages of the m modules detected by the voltage detector.

15. The energy transfer circuit according to claim 14, wherein the controller determines a target voltage or a target capacity of the m modules based on the voltages of the m modules detected by the voltage detector, determines that a module with a voltage or a capacity higher than the target voltage or the target capacity is a module to be discharged, and determines that a module with a voltage or a capacity lower than the target voltage or the target capacity is a module to be charged.

16. The energy transfer circuit according to claim 14, wherein each of the m modules includes a plurality of cells connected in series, a cell voltage detector that detects cell voltages of the plurality of cells, and a cell equalizing circuit that equalizes a plurality of cell voltages within a same module based on the cell voltages detected by the cell voltage detector, and the cell equalizing circuit operates in cooperation with the controller by communication, and executes an equalizing process among the plurality of cells after an equalizing process among the m modules is executed.

17. A power storage system, comprising:

the energy transfer circuit according to claim 9; and the m modules connected in series, where m is an integer of 2 or more.

* * * * *